United States Patent
Schimpf et al.

(10) Patent No.: US 12,553,494 B2
(45) Date of Patent: Feb. 17, 2026

(54) ZIP LINE FOR PANEL WIRE MANAGEMENT

(71) Applicant: Simplicity Ventures, LLC, Holladay, UT (US)

(72) Inventors: Brady Schimpf, Eagle Point, OR (US); Benjamin Wade, Holladay, UT (US); Alexander Bornemann, Duxbury, VT (US)

(73) Assignee: EASY SOLAR PRODUCTS, INC., Sandy, UT (US)

( * ) Notice: Subject to any disclaimer, the term of this patent is extended or adjusted under 35 U.S.C. 154(b) by 290 days.

(21) Appl. No.: 18/120,630

(22) Filed: Mar. 13, 2023

(65) Prior Publication Data

US 2024/0309936 A1    Sep. 19, 2024

(51) Int. Cl.
*H02S 30/10*    (2014.01)
*F16G 11/02*    (2006.01)
*H02S 40/34*    (2014.01)

(52) U.S. Cl.
CPC ............ *F16G 11/02* (2013.01); *H02S 30/10* (2014.12); *H02S 40/34* (2014.12)

(58) Field of Classification Search
None
See application file for complete search history.

(56) References Cited

U.S. PATENT DOCUMENTS

| | | | |
|---|---|---|---|
| 10,063,185 B2 | 8/2018 | Hudson et al. | |
| 11,007,954 B2* | 5/2021 | Kisu | H01B 13/01254 |
| 2009/0229085 A1 | 9/2009 | Franklin et al. | |
| 2011/0220180 A1* | 9/2011 | Cinnamon | H10F 77/937 136/251 |

(Continued)

FOREIGN PATENT DOCUMENTS

| | | |
|---|---|---|
| JP | H0711971 U | 2/1995 |
| JP | 5696278 B2 | 4/2015 |
| KR | 101839352 B1 | 3/2018 |

OTHER PUBLICATIONS

Anonymous, "Upfitting Blue—Project 2: Mounting Solar Panels—Just a Little Further", Nov. 18, 2017, https://justalittlefurther.com/just-a-little-further/2017/11/11/upfitting-blue-project-2-mounting-solar-panels, pp. 1-9, date downloaded on Jun. 17, 2024.

(Continued)

*Primary Examiner* — Steven M Marsh
(74) *Attorney, Agent, or Firm* — KW Law, LLP

(57) ABSTRACT

An apparatus for a zip line wire management system is disclosed. The apparatus includes a first mounting clip and a second mounting clip. The first and second mounting clips are configured to connect to a frame of a panel. The first mounting clip includes a first spanning member connection point and the second mounting clip includes a second spanning member connection point. The apparatus includes a spanning member configured to connect between the first spanning member connection point and the second spanning member connection point. The apparatus includes at least one tensioner configured to provide tension to the spanning member while the spanning member is connected between the first mounting clip and the second mounting clip. The spanning member is configured to support a wire of the panel.

18 Claims, 16 Drawing Sheets

(56) References Cited

U.S. PATENT DOCUMENTS

| | | | | |
|---|---|---|---|---|
| 2011/0220596 | A1* | 9/2011 | Cusson | F24S 25/13 |
| | | | | 24/522 |
| 2011/0240089 | A1* | 10/2011 | Wootton | H10F 77/939 |
| | | | | 136/244 |
| 2012/0037202 | A1* | 2/2012 | Gosnell | H02S 40/34 |
| | | | | 174/650 |
| 2012/0156946 | A1* | 6/2012 | Cohen | H02S 40/34 |
| | | | | 439/754 |
| 2013/0048046 | A1* | 2/2013 | Domsic | H02S 40/34 |
| | | | | 29/877 |
| 2013/0269181 | A1* | 10/2013 | McBride | H02S 40/00 |
| | | | | 52/745.21 |
| 2017/0187328 | A1* | 6/2017 | Miljkovic | H02S 40/34 |
| 2018/0019703 | A1* | 1/2018 | Almy | H02S 30/10 |
| 2018/0375463 | A1* | 12/2018 | Gorny | H02S 40/36 |
| 2020/0366238 | A1 | 11/2020 | Schimpf | |

OTHER PUBLICATIONS

PCT International Search Report for International Application No. PCT/US2024/017292 dated Sep. 3, 2024 (7 pages).

PCT Written Opinion of the International Searching Committee for International Application No. PCT/US2024/017292 dated Sep. 3, 2024 (10 pages).

"Uplifting Blue—Project 2: Mounting Solar Panels," retrieved from <https://justalittlefurther.com/just-a-little-further-/2017/11/11/uplifting-blue-project-2-mounting-solar-panels> dated Nov. 18, 2017 (9 pages).

\* cited by examiner

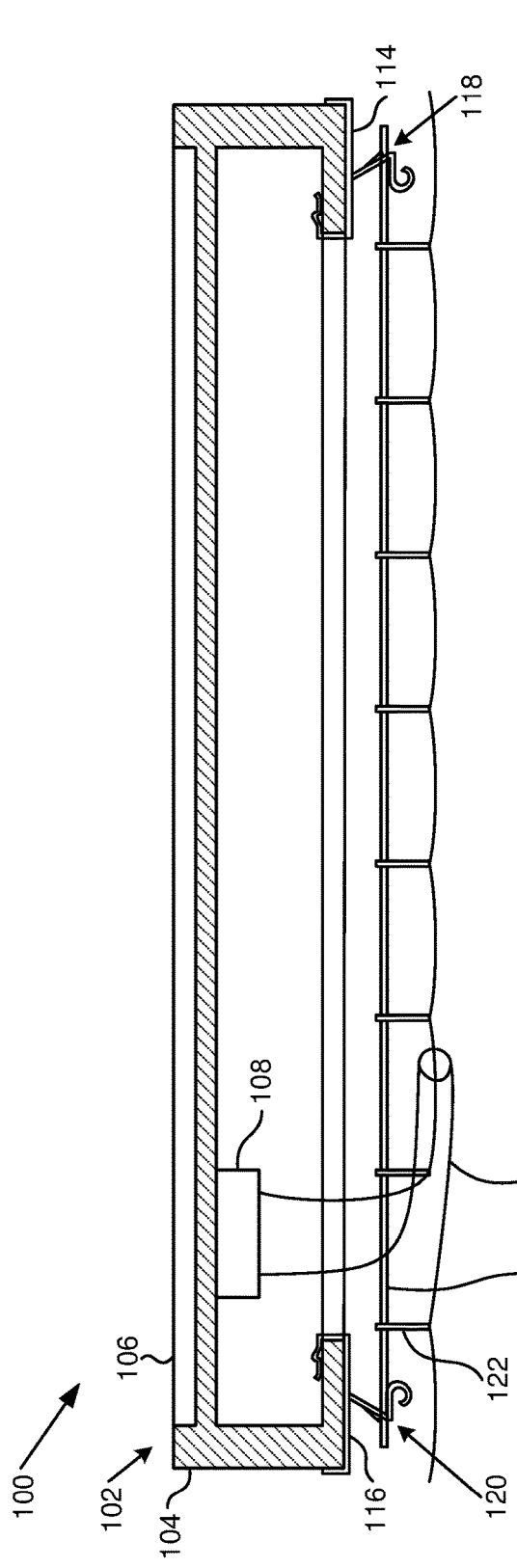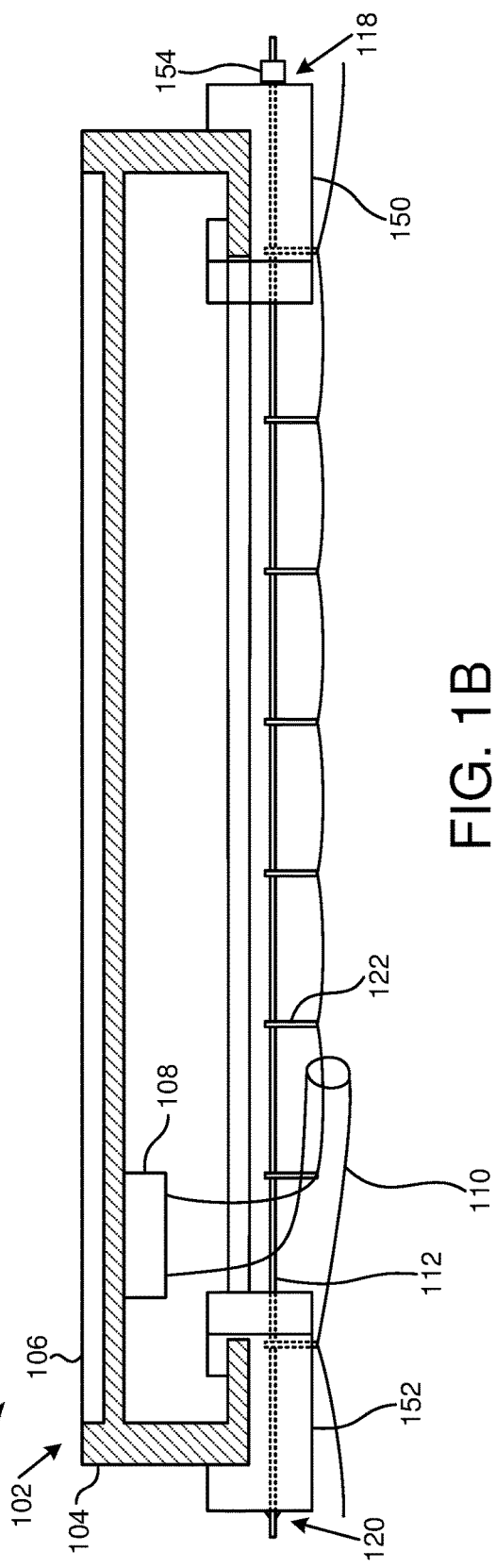
FIG. 1A
FIG. 1B

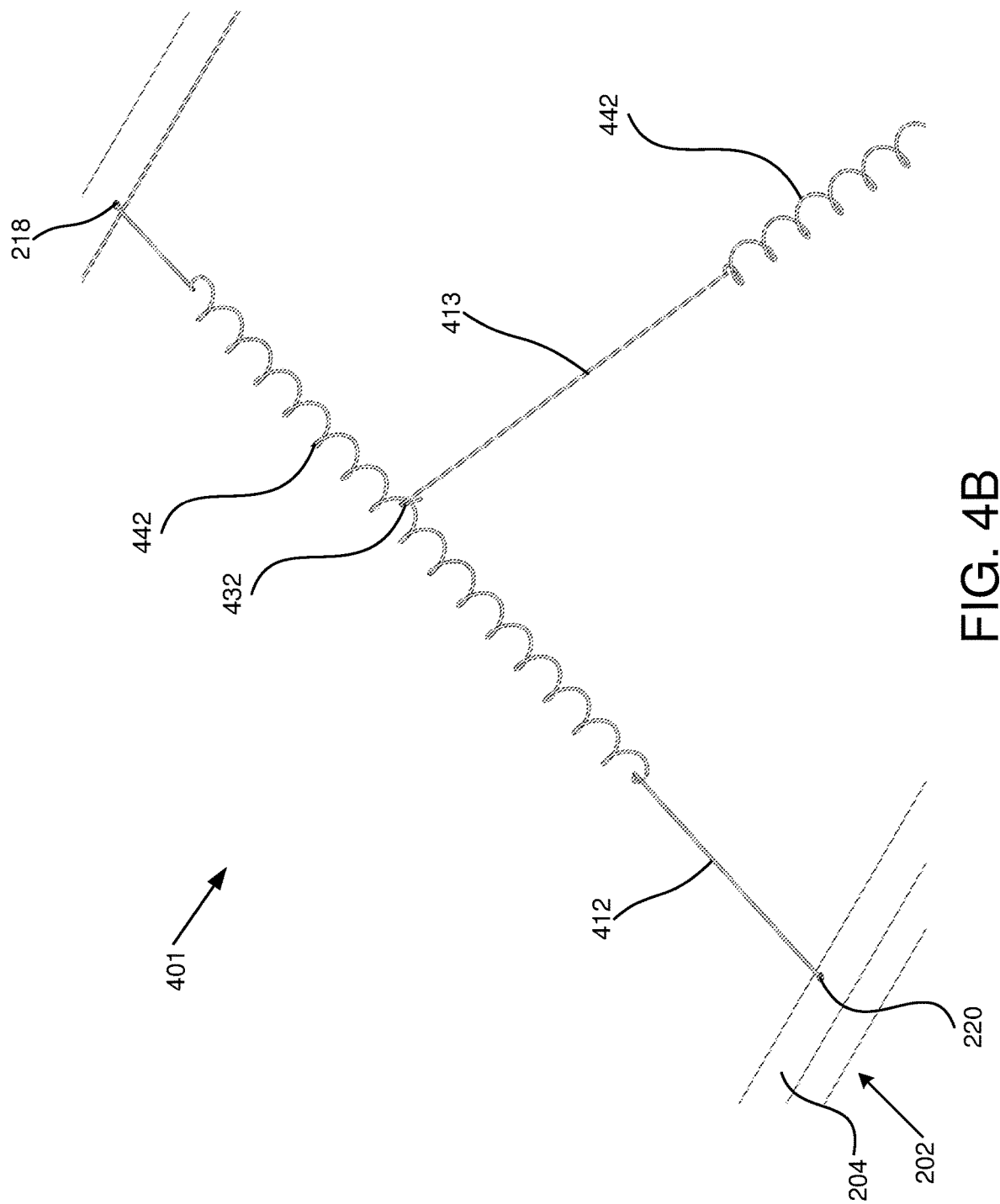

ZIP LINE FOR PANEL WIRE MANAGEMENT

FIELD

This invention relates to wire management and more particularly relates to a zip line wire management system for wiring from panels, such as solar panels.

BACKGROUND

Electrical panels, such as solar panels, typically include wiring to connect the panels. Often the panels include a junction box with one or more wires extending from the junction boxes that connect to other wires, connect to other panels, connect to other devices, etc. Where the panels are solar panels, often the wires are mounted under the solar panels in a space between the solar panels and a roof as well as space between the solar panels and structural supports, all of which is often abrasive. Wires drooping too low and exposed to wind and other weather often cause the wires to rub against the roof, which damages the wires. The panels may also be ground mounted where drooping cables are also subject to wear. In addition, drooping wires is unsightly and undesirable.

SUMMARY

An apparatus for a zip line wire management system is disclosed. The apparatus includes a first mounting clip and a second mounting clip. The first and second mounting clips are configured to connect to a frame of a panel. The first mounting clip includes a first spanning member connection point and the second mounting clip includes a second spanning member connection point. The apparatus includes a spanning member configured to connect between the first spanning member connection point and the second spanning member connection point. The apparatus includes at least one tensioner configured to provide tension to the spanning member while the spanning member is connected between the first mounting clip and the second mounting clip. The spanning member is configured to support a wire of the panel.

Another apparatus for a zip line wire management system includes a first spanning member connection point and a second spanning member connection point. The first and second spanning member connection points are each configured to be positioned on a frame of a panel. The apparatus includes a spanning member configured to connect between the first spanning member connection point and the second spanning member connection point and at least one tensioner configured to provide tension to the spanning member while the spanning member is connected between the first spanning member connection point and the second spanning member connection point. The spanning member is configured to support a wire of the panel.

Another apparatus for a zip line wire management system includes a first mounting clip and a second mounting clip. The first and second mounting clips are configured to connect to a frame of a panel. The first mounting clip includes a first spanning member connection point and the second mounting clip includes a second spanning member connection point. The apparatus includes a spanning member configured to connect between the first spanning member connection point and the second spanning member connection point and at least one tensioner configured to provide tension to the spanning member while the spanning member is connected between the first mounting clip and the second mounting clip. The spanning member is configured to support a wire of the panel. The spanning member includes a cable stop at a first end of the spanning member and a tensioner of the at least one tensioner at a second end of the spanning member or the at least one tensioner includes a first tensioner on the spanning member at the first end of the spanning member and a second tensioner on the spanning member at the second end of the spanning member.

In some embodiments, the cable stop positioned on a side of the first mounting clip opposite a center section between the first and second mounting clips is configured to prevent the spanning member from being pulled through the first spanning member connection point resulting from a force applied to the spanning member toward the center section. In other embodiments, the first tensioner and/or the second tensioner each include a locking mechanism positioned on a side of the first or second spanning member connection point opposite the center section and configured to resist movement of the spanning member in a first direction toward the center section and configured to allow movement of the spanning member in a second direction opposite the first direction. Applying a force on the spanning member on an end of the spanning member with a tensioner in the second direction provides tension to the spanning member.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1A is a side section view illustrating a panel with a zip line wire management system with a first type of mounting clips, according to various embodiments;

FIG. 1B is a side section view illustrating a panel with a zip line wire management system with a second type of mounting clips, according to various embodiments;

FIG. 4B is a close-up view of a connection between the first spanning member and the second spanning member of FIG. 4A, according to various embodiments;

DETAILED DESCRIPTION

Figure 2A:
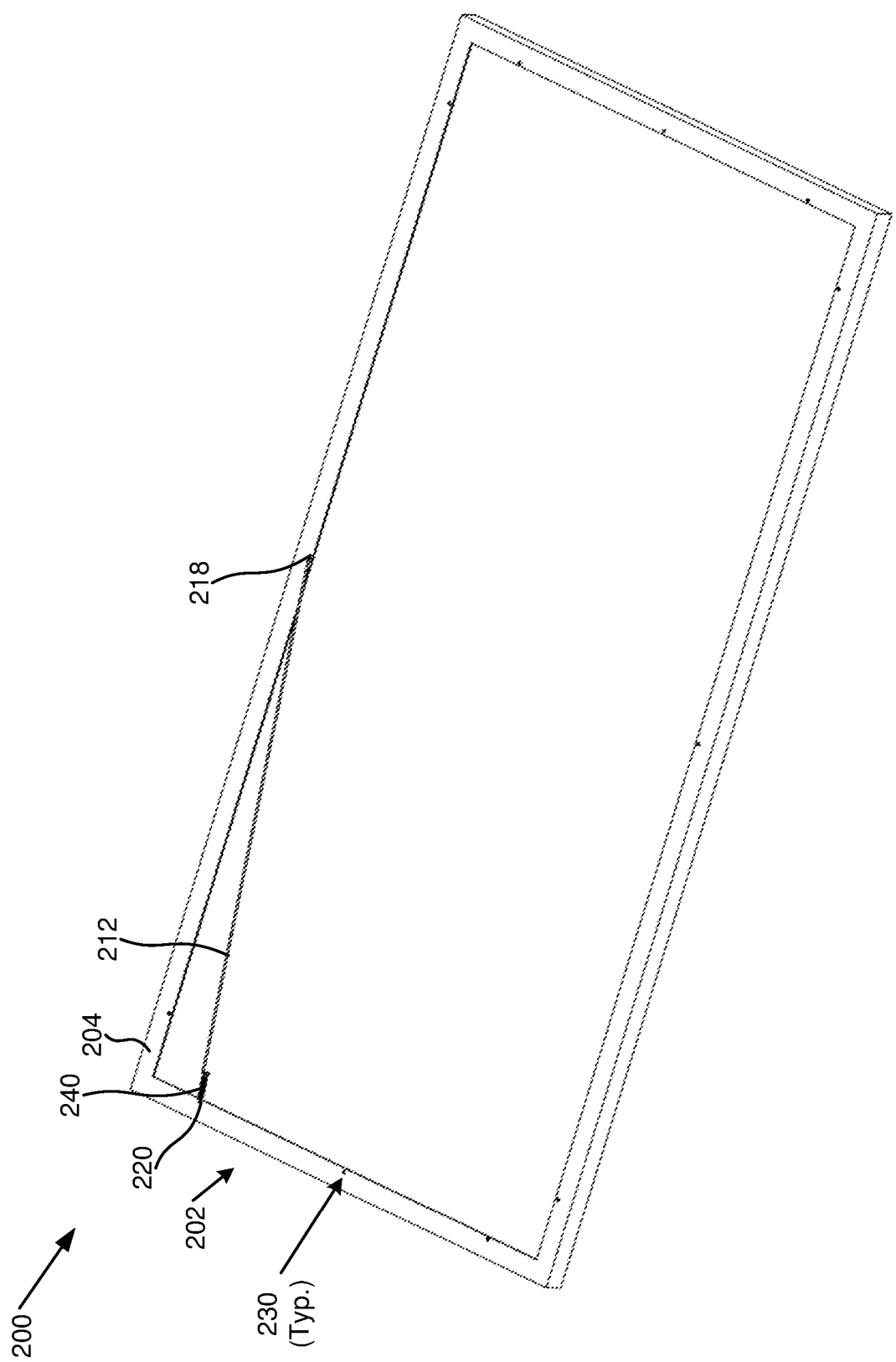
FIG. 2A is a perspective view illustrating a panel with a spanning member connected between openings of a panel frame, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for a zip line wire management system is disclosed. The apparatus includes a first mounting clip and a second mounting clip. The first and second mounting clips are configured to connect to a frame of a panel. The first mounting clip includes a first spanning member connection point and the second mounting clip includes a second spanning member connection point. The apparatus includes a spanning member configured to connect between the first spanning member connection point and the second spanning member connection point. The apparatus includes at least one tensioner configured to provide tension to the spanning member while the spanning member is connected between the first mounting clip and the second mounting clip. The spanning member is configured to support a wire of the panel.

In some embodiments, the spanning member includes a cable stop at a first end of the spanning member and a tensioner of the at least one tensioner at a second end of the spanning member. In other embodiments, the spanning member includes a cable stop at each end of the spanning member and a tensioner of the at least one tensioner between the first and second mounting clips. In other embodiments, the at least one tensioner includes a first tensioner on the spanning member at the first end of the spanning member and a second tensioner on the spanning member at the second end of the spanning member. In other embodiments, the cable stop positioned on a side of the first mounting clip opposite a center section between the first and second mounting clips is configured to prevent the spanning member from being pulled through the first spanning member connection point resulting from a force applied to the spanning member toward the center section.

In other embodiments, the first tensioner and/or the second tensioner each include a locking mechanism positioned on a side of the first or second spanning member connection point opposite the center section and configured to resist movement of the spanning member in a first direction toward the center section and configured to allow movement of the spanning member in a second direction opposite the first direction. Applying a force on the spanning member on an end of the spanning member with a tensioner in the second direction provides tension to the spanning member. In other embodiments, the at least one spanning member tensioner includes a spring attached to the spanning member where the spring includes a connector configured to attach to the first or second spanning member connection point.

In some embodiments, the at least one spanning member tensioner includes a spring force provided by the first mounting clip and/or the second mounting clip resulting from a force applied to the spanning member in a direction opposite a center section between the first and second mounting clips and securing the spanning member at the first and second spanning member connection points after the force is applied to the spanning member. In other embodiments, one or both of the first mounting clip and the second mounting clip include a locking mechanism configured to resist movement of the spanning member in a first direction toward a center section between the first and second mounting clips and configured to allow movement of the spanning member in a second direction opposite the first direction. Applying a force on the spanning member on an end of the spanning member in the second direction provides tension to the spanning member.

In some embodiments, the first spanning member connection point and/or the second spanning member connection point include one or more openings sized to accommodate the spanning member. In other embodiments, the apparatus includes one or more wire supports connected to the spanning member. Each wire support is configured to support the wire of the panel. In other embodiments, the spanning member includes a cable and the first mounting clip and/or the second mounting clip each include a slack management opening configured to hold a portion of the spanning member extending from the first or second mounting clip. In other embodiments, the spanning member includes at least a portion that is rigid.

Another apparatus for a zip line wire management system includes a first spanning member connection point and a second spanning member connection point. The first and second spanning member connection points are each configured to be positioned on a frame of a panel. The apparatus includes a spanning member configured to connect between the first spanning member connection point and the second spanning member connection point and at least one tensioner configured to provide tension to the spanning member while the spanning member is connected between the first spanning member connection point and the second spanning member connection point. The spanning member is configured to support a wire of the panel.

In some embodiments, the first spanning member connection point is on a first mounting clip and the second spanning member connection point is on a second mounting clip. The first mounting clip and the second mounting clip are configured to attach to the frame of the panel. In some embodiments, the spanning member includes a cable stop at a first end of the spanning member and a tensioner of the at least one tensioner at a second end of the spanning member. In other embodiments, the at least one tensioner includes a first tensioner on the spanning member at the first end of the spanning member and a second tensioner on the spanning member at the second end of the spanning member.

In other embodiments, the cable stop positioned on a side of the first mounting clip opposite a center section between the first and second mounting clips is configured to prevent the spanning member from being pulled through the first spanning member connection point resulting from a force applied to the spanning member toward the center section. In other embodiments, the first tensioner and/or the second tensioner each include a locking mechanism positioned on a side of the first or second spanning member connection point opposite the center section and configured to resist movement of the spanning member in a first direction toward the center section and configured to allow movement of the spanning member in a second direction opposite the first direction. Applying a force on the spanning member on an end of the spanning member with a tensioner in the second direction provides tension to the spanning member. In other embodiments, the at least one spanning member tensioner includes a spring attached to the spanning member where the spring includes a connector configured to attach to the first or second spanning member connection point.

In some embodiments, the at least one spanning member tensioner includes a spring force provided by the first mounting clip and/or the second mounting clip resulting from a force applied to the spanning member in a direction opposite a center section between the first and second mounting clips and securing the spanning member at the first and second spanning member connection points after the force is applied to the spanning member. In other embodiments, one or both of the first mounting clip and the second mounting clip include a locking mechanism configured to resist movement of the spanning member in a first direction toward a center section between the first and second mounting clips and configured to allow movement of the spanning member in a second direction opposite the first direction where applying a force on the spanning member on an end of the spanning member in the second direction provides tension to the spanning member.

In some embodiments, the spanning member includes a first spanning member and the tensioner includes a first tensioner and the apparatus includes a second spanning member with a second tensioner and a third spanning member connection point positioned on the frame. The second spanning member is configured to connect between the third spanning member connection point and the first spanning member. In other embodiments, the first spanning member connection point and the second spanning member connection point each include an opening in the frame of the panel.

Another apparatus for a zip line wire management system includes a first mounting clip and a second mounting clip. The first and second mounting clips are configured to connect to a frame of a panel. The first mounting clip includes a first spanning member connection point and the second mounting clip includes a second spanning member connection point. The apparatus includes a spanning member configured to connect between the first spanning member connection point and the second spanning member connection point and at least one tensioner configured to provide tension to the spanning member while the spanning member is connected between the first mounting clip and the second mounting clip. The spanning member is configured to support a wire of the panel. The spanning member includes a cable stop at a first end of the spanning member and a tensioner of the at least one tensioner at a second end of the spanning member or the at least one tensioner includes a first tensioner on the spanning member at the first end of the spanning member and a second tensioner on the spanning member at the second end of the spanning member.

In some embodiments, the cable stop positioned on a side of the first mounting clip opposite a center section between the first and second mounting clips is configured to prevent the spanning member from being pulled through the first spanning member connection point resulting from a force applied to the spanning member toward the center section. In other embodiments, the first tensioner and/or the second tensioner each include a locking mechanism positioned on a side of the first or second spanning member connection point opposite the center section and configured to resist movement of the spanning member in a first direction toward the center section and configured to allow movement of the spanning member in a second direction opposite the first direction. Applying a force on the spanning member on an end of the spanning member with a tensioner in the second direction provides tension to the spanning member.

FIG. 1A is a side section view illustrating a panel 102 with a zip line wire management system 100 with a first type of mounting clips 114, 116, according to various embodiments. A panel 102, in some embodiments is a solar panel that includes a frame 104 and solar cells 106 connected to a junction box 108. In other embodiments, the panel 102 is another type of panel with electrical components. A junction box, as used herein, is any box, compartment, void, etc. where wire 110 enters and connects to other wires or to an electrical component. In various examples, a junction box includes a box at the back of a solar panel, a cavity at the back of a light fixture, a stand-alone electrical junction box, an entry point at an electrical component, and the like. Often a solar panel 102 includes a frame 104 with a top surface that supports one or more solar cells 106 that generate electrical energy when exposed to the sun. The solar cells 106 include one or more wires that terminate in a junction box 108 and wires 110 extending from the junction box 108. A typical solar panel installation includes an array of solar panels, each with a junction box 108 and wires 110 that often daisy chain together, are connected in parallel, are connected in series, or some combination thereof. Wire management is a constant issue and often solar panel installations end up with wires 110 drooping down onto a roof, which often has an abrasive surface. Weather conditions and wind often damage the wires 110.

A zip line wire management system 100 as described herein provides a spanning a spanning member 112 configured to support the wires 110, which helps prevent damage to the wires 110 and provides a way to create a more visually pleasing installation. In some embodiments, the spanning member 112 is connected between a first mounting clip 114 and a second mounting clip 116, which are mounted to the frame 104. The first mounting clip 114 includes a first spanning member connection point 118 and the second mounting clip 116 includes a second spanning member connection point 120 where the spanning member 112 is configured to connect between the first spanning member connection point 118 and the second spanning member connection point 120.

The zip line wire management system 100 includes a tensioner configured to provide tension to the spanning member 112 while the spanning member 112 is connected between the first mounting clip 114 and the second mounting clip 116. In some embodiments, at least one tensioner is configured to provide tension to the spanning member 112 while the spanning member 112 is connected between the first mounting clip 114 and the second mounting clip 116. In the embodiment depicted in FIG. 1A, the first and second mounting clips 114, 116 each include a tensioner (first tensioner and second tensioner), as depicted in more detail in the embodiments of FIGS. 5A-5D. In some embodiments, the tensioner in FIG. 1A includes a spring force provided by the arm extending upward to the spanning member connection points 118, 120.

The first tensioner and the second tensioner each include a locking mechanism positioned on a side of the first or second spanning member connection point 118, 120 opposite the center section between the first and second mounting clips 114, 116 and configured to resist movement of the spanning member 112 in a first direction toward the center section and configured to allow movement of the spanning member 112 in a second direction opposite the first direction. Applying a force on the spanning member 112 on an end of the spanning member with a tensioner in the second direction provides tension to the spanning member 112.

The tensioners of FIG. 1A are in the form of an angled tab configured to resist movement of the spanning member 112 in a first direction toward the center section and configured to allow movement of the spanning member 112 in a second direction opposite the first direction. In some embodiments, the tab has a sharp edge, groove, indentation, etc. and is angled in such a way that movement of the spanning member 112 in one direction causes the tab to dig into the spanning member 112 preventing further movement. Movement of the spanning member 112 in an opposite direction moves the tab in a way that the spanning member 112 is able to continue to move.

Applying tension to the spanning member 112 helps to maintain the spanning member 112 substantially straight between the first and second spanning member connection points 118, 120. Maintaining the spanning member 112 substantially straight includes providing enough tension to avoid any substantial drooping such that the spanning member 112 is suitable for supporting the wire 110 to prevent the wire 110 from drooping.

In some embodiments, the tensioners described herein provide an amount of tension to allow for thermal expansion, prevent damage to mounting clips, and to the spanning members while providing enough support for wires to prevent damage due to wind, rubbing on roof shingles, structural elements, etc. In some embodiments, the spanning member(s) and tensioner(s) are made of materials that avoid stretching and sagging over time, such as high quality metals, springs, etc. In some embodiments, the tensioners described herein provide a low amount of tension to prevent failure caused by thermal cycling of high tension spanning members while providing enough tension to avoid sagging that would lead to damage of the wires 110.

In some embodiments, the spanning member 112 is rigid, such as a solid wire, stamped steel, or the like. Where the spanning member 112 is rigid, tensioning requirements may be less and may include merely supporting the spanning member 112 in a fixed position. In other embodiments, the spanning member 112 is flexible, such as a stainless-steel cable, a plastic-coated stainless-steel cable, a zinc-coated cable, and aluminum cable, a polymer cable, or the like. Where the spanning member 112 is flexible, the tensioner provides tension on the spanning member 112 to prevent sagging and is configured to retain the spanning member 112 with tension for an extended period of time. Various tensioners to be used with the zip line wire management system 100 are described below.

In the embodiments of FIG. 1A, the spanning member 112 includes wire supports 122 that support the wires 110. In some embodiments, the wire supports 122 are fixed to the spanning member 112. In other embodiments, the wire supports 122 are movable along the spanning member 112. In other embodiments, the wire supports 122 are configured to be loaded onto the spanning member 112 before the spanning member 112 is placed in the mounting clips 114, 116. In other embodiments, the wire supports 122 may be placed on the spanning member 112 after the spanning member 112 is placed in the mounting clips 114, 116.

Figure 7:
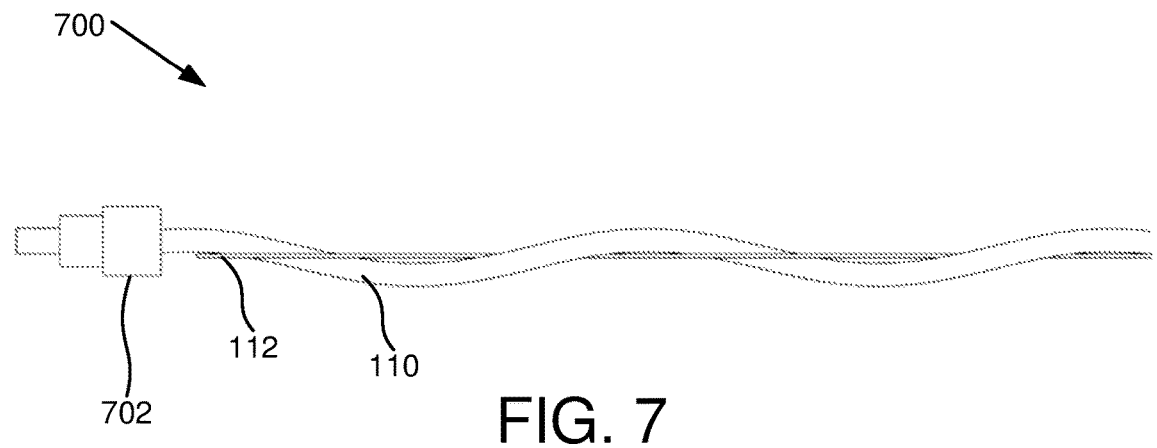
FIG. 7 is a side view of an illustration of a spanning member with a wire wrapped around the spanning member, according to various embodiments.

In some embodiments, the wire supports 122 are clips that clip to the spanning member 112 at one end and include a hanger, a C-shaped loop, or other structure suitable for supporting the wire 110 at the other end of the wire supports 122. In some embodiments, the wire supports 122 are metal, such as stainless steel or plastic-coated metal. In other embodiments, the wire supports 122 are nylon, plastic or the like. In some embodiments, the wire supports 122 are designed to not degrade or to degrade an acceptable amount during an expected lifetime while exposed to sun, wind, heat, cold, moisture, etc. One of skill in the art will recognize other forms of a wire supports 122 configured to support the wire 110. In other embodiments, the spanning member 112 does not include wire supports 122 and the wire 110 is wrapped around the spanning member 112, as depicted in FIG. 7.

In the embodiments of FIG. 1A, the junction box 108 includes two wires 110, which is typical for solar panels. One wire 110 on the right side may connect to a solar panel on the right and the other wire 110 extending to the left may connect to another solar panel on the left side. In some embodiments, the wire 110 is looped to take up slack. One of skill in the art will recognize other ways to use the spanning member 112 to support wires 110.

The wires 110 are typically not designed to have high tension. Where wires 110 are wound around spanning members 112, as depicted in FIG. 7, the wires 110 typically are supported without stretching the wires 110 enough to cause damage. Likewise, where wire supports 122 are provided, the spanning members 112 may include tension while the wires 110 may be strung with lower tension by having enough tension minimize drooping while not having too much tension to cause damage.

FIG. 1B is a side section view illustrating a panel 102 with a zip line wire management system 101 with a second type of mounting clips 150, 152, according to various embodiments. The zip line wire management system 101 of FIG. 1B includes a panel 102 that is a solar panel that includes a frame 104 and solar cells 106 connected to a junction box 108, as in FIG. 1A. In other embodiments, the panel 102 is another type of panel with electrical components. The solar cells 106 include one or more wires that terminate in a junction box 108 and wires 110 extending from the junction box 108.

The zip line wire management system 101 of FIG. 1B includes a spanning a spanning member 112 configured to support the wires 110. In some embodiments, the spanning member 112 is connected between a first mounting clip 150 and a second mounting clip 152, which are mounted to the frame 104. The first mounting clip 150 includes a first spanning member connection point 118 and the second mounting clip 152 includes a second spanning member connection point 120 where the spanning member 112 is configured to connect between the first spanning member connection point 118 and the second spanning member connection point 120.

The zip line wire management system 101 of FIG. 1B includes a tensioner configured to provide tension to the spanning member 112 while the spanning member 112 is connected between the first mounting clip 150 and the second mounting clip 152. In the embodiments of FIG. 1B, one tensioner on the second mounting clip 152 is configured to provide tension to the spanning member 112 while the spanning member 112 is connected between the first mounting clip 150 and the second mounting clip 152. In the embodiment depicted in FIG. 1B, the first mounting clip 150 does not include a tensioner but instead the spanning member 112 includes a cable stop 154 that prevents the spanning member 112 from pulling through the first spanning member connection point 118 toward the second mounting clip 152. The second mounting clip 152 is depicted in more detail in the embodiments of FIGS. 9A-9D.

The first mounting clip 150 is similar to the second mounting clip 152 but may or may not include a tensioner. Where the first mounting clip 150 includes a tensioner, the cable stop 154 may not be included. The tensioners are in the form of one or more angled tabs configured to resist movement of the spanning member 112 in a first direction toward a center section between the first and second mounting clips 150, 152 and configured to allow movement of the spanning member 112 in a second direction opposite the first direction. Applying a force on the spanning member 112 on an end of the spanning member 112 in the second direction provides tension to the spanning member 112. In the embodiments of FIG. 1B, the spanning member 112 includes wire supports 122 that support the wires 110 similar to the wire supports 122 of FIG. 1A.

In the embodiments of FIG. 1B, as with FIG. 1A the junction box 108 includes two wires 110, which is typical for solar panels. One wire 110 on the right side may connect to a solar panel on the right and the other wire 110 extending to the left may connect to another solar panel on the left side.

Figure 2B:
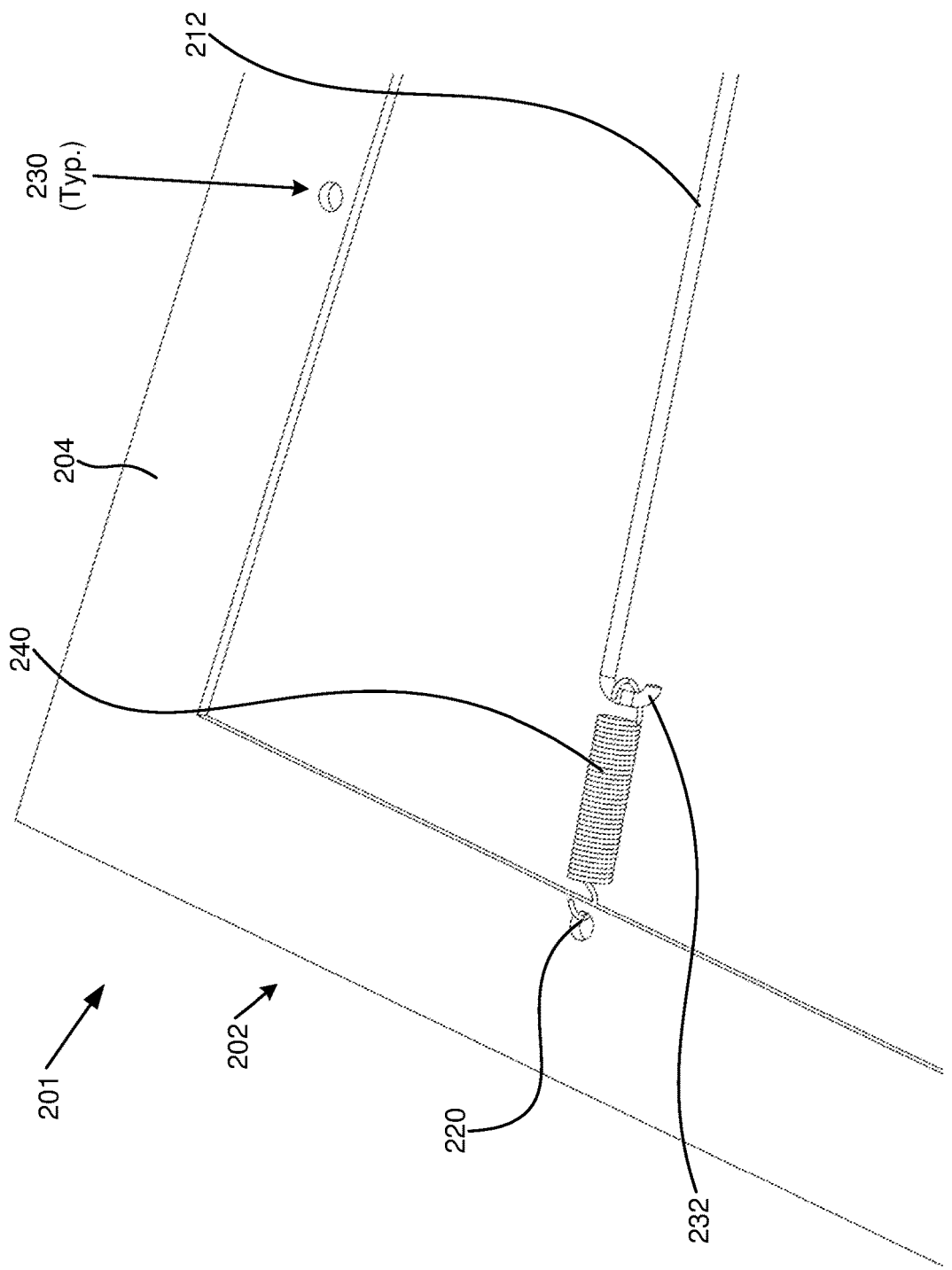
FIG. 2B is a close-up view of an end of the spanning member of FIG. 2A illustrating a tensioner in the form of a spring, according to various embodiments.

FIG. 2A is a perspective view 200 illustrating a panel 202 with a spanning member 212 connected between openings 230 of a panel frame 204, according to various embodiments. FIG. 2B is a close-up view 201 of an end of the spanning member of FIG. 2A illustrating a tensioner in the form of a spring 240, according to various embodiments. In some embodiments, the panel 202 is a solar panel. In some embodiments, the panel 202 of FIGS. 2A and 2B is similar to the panel 102 of FIGS. 1A and 1B, but include openings 230, which may be used for connection of spanning members 212. (As used herein, panel 102 and panel 202 are used interchangeably.) The spanning member 212 is similar to the spanning member 112 of FIGS. 1A and 1B.

The panel 202, in the embodiments, depicted in FIGS. 2A and 2B includes a first spanning connection point 218 and a second spanning connection point 220 in the form of openings 230 in the frame 204. In the embodiments depicted in FIGS. 2A and 2B the spanning member 212 is rigid and includes a bent end 232 to connect to the openings 230. In other embodiments, the spanning member 212 is flexible and may be connected via a cable stop, cable clamp, or the like.

Figure 3A:
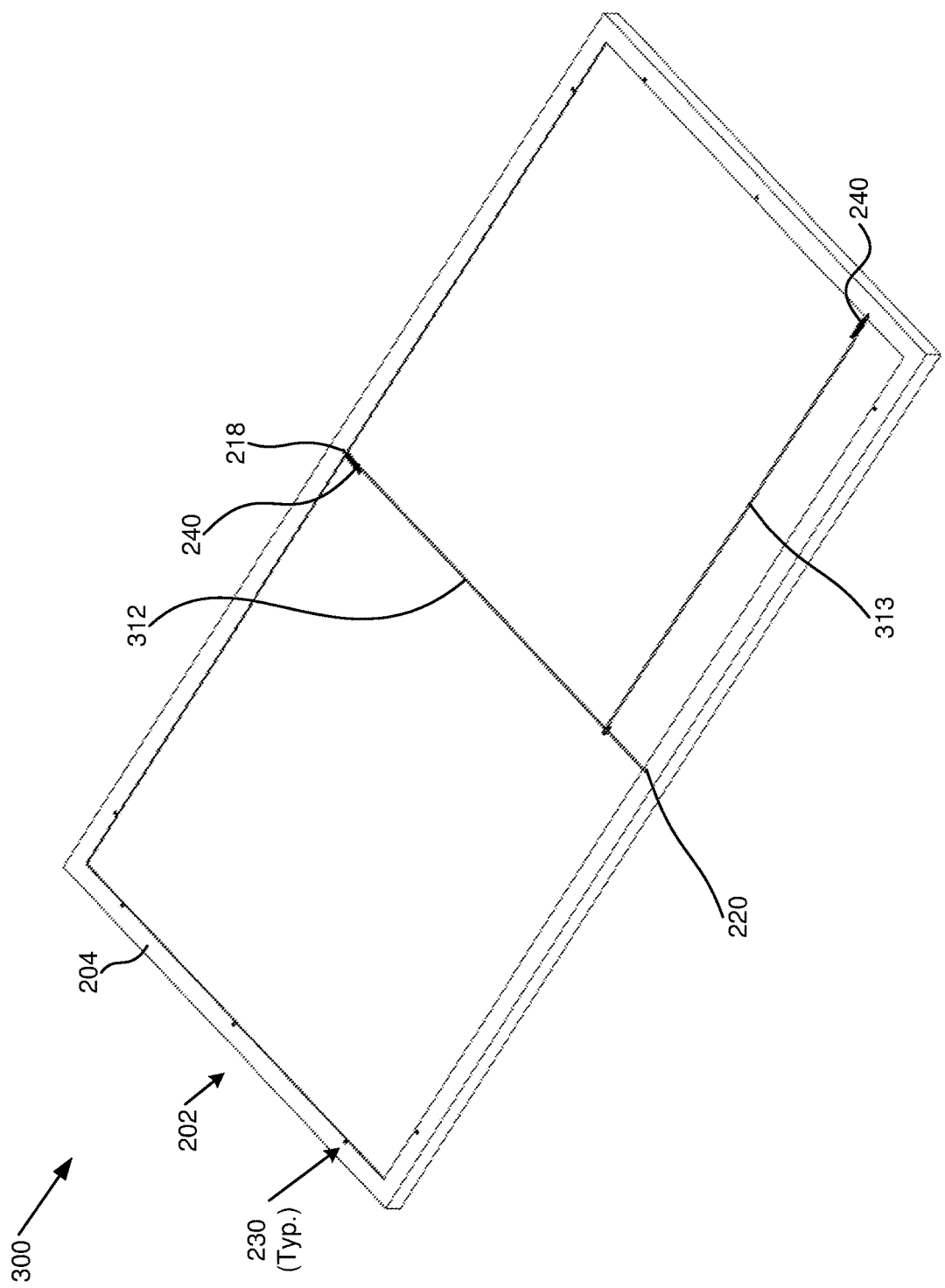
FIG. 3A is a perspective view illustrating a panel with a first spanning member connected between openings of a panel frame and a second spanning member connected between an opening in the frame and the first spanning member, according to various embodiments.
Figure 3B:
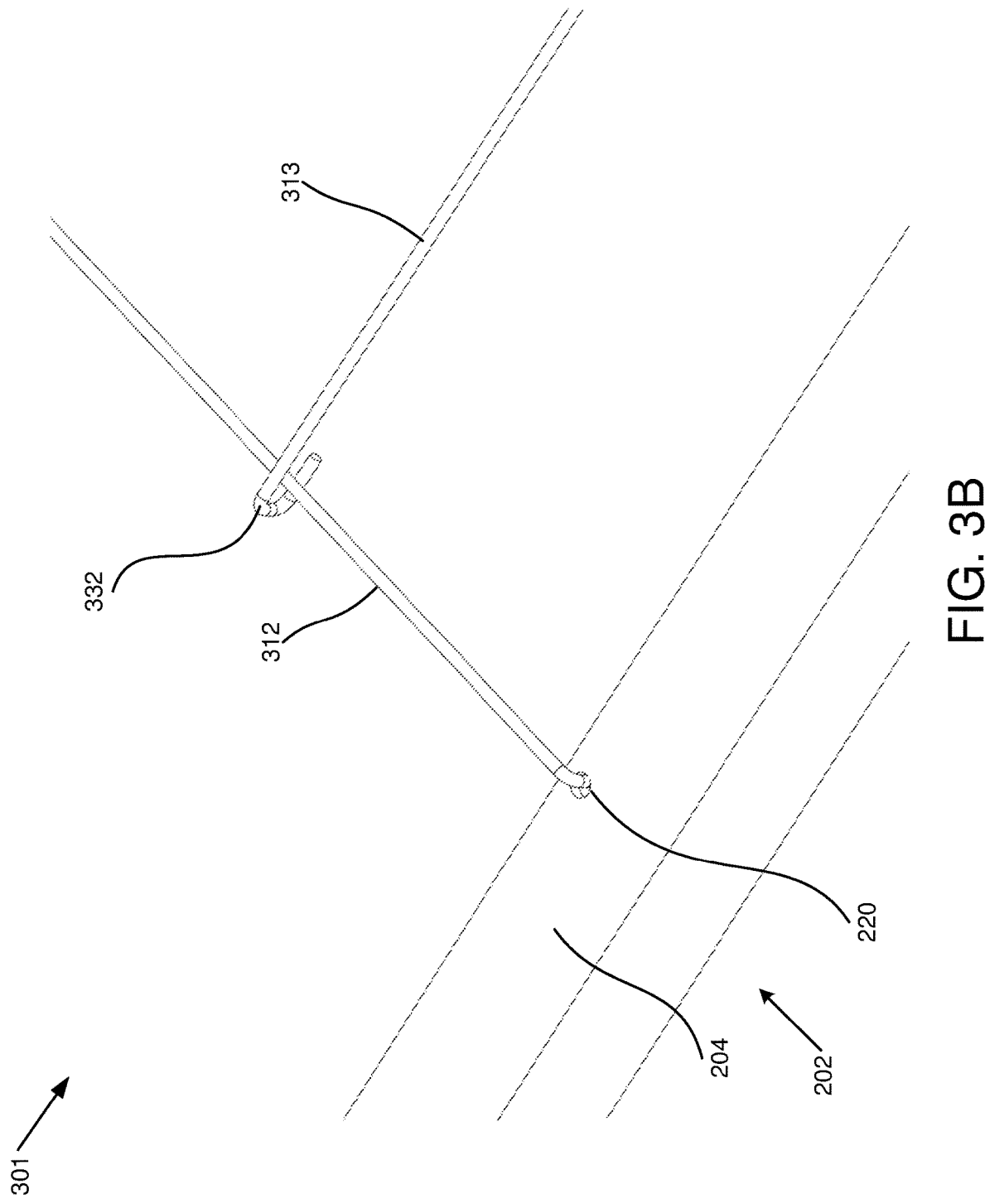
FIG. 3B is a close-up view of a connection between the first spanning member and the second spanning member of FIG. 3A, according to various embodiments.

FIG. 3A is a perspective view 300 illustrating a panel 202 with a first spanning member 312 connected between openings 230 of a panel frame 204 and a second spanning member 313 connected between an opening 230 in the frame 204 and the first spanning member 312, according to various embodiments. FIG. 3B is a close-up view 301 of a connection between the first spanning member 312 and the second spanning member 313 of FIG. 3A, according to various embodiments. The first and second spanning members 312, 314 each include a tensioner in the form of a spring 240, which is similar to the spring 240 of FIGS. 2A and 2B. The panel 202 of FIGS. 3A and 3B is substantially similar to the panel 202 of FIGS. 2A and 2B.

In some embodiments, the spanning member 312 does not include a spring 240 but is instead sized to connect to each of the first spanning connection point 218 and the second spanning connection point 220. In the embodiment, the frame 204 may include some amount of flex so that the spanning member 312 may be inserted into holes serving as the first spanning connection point 218 and the second spanning connection point 220 and the flex provides some spring force to hold the spanning member 312 in place. Where the spanning member 312 is cut to length and fits in hole serving as the first spanning connection point 218 and the second spanning connection point 220, in some embodiments, the spanning member 312 is rigid.

The panel 202, in the embodiments, depicted in FIGS. 3A and 3B includes a first spanning connection point 218 and a second spanning connection point 220 for the first spanning member 312 in the form of openings 230 in the frame 204. In the embodiments depicted in FIGS. 3A and 3B the first spanning member 312 and the second spanning member 313 are rigid and includes a bent end 332 to connect to the openings 230 and to the first spanning member 312. In other embodiments, the spanning members 312, 313 are flexible and may be connected via a cable stop (e.g., 154), cable clamp, or the like. In some embodiments, the spanning members 312, 313 may include a tensioner different than the spring 240, such as a tensioner located in a middle section of a spanning member 312,313.

Figure 4A:
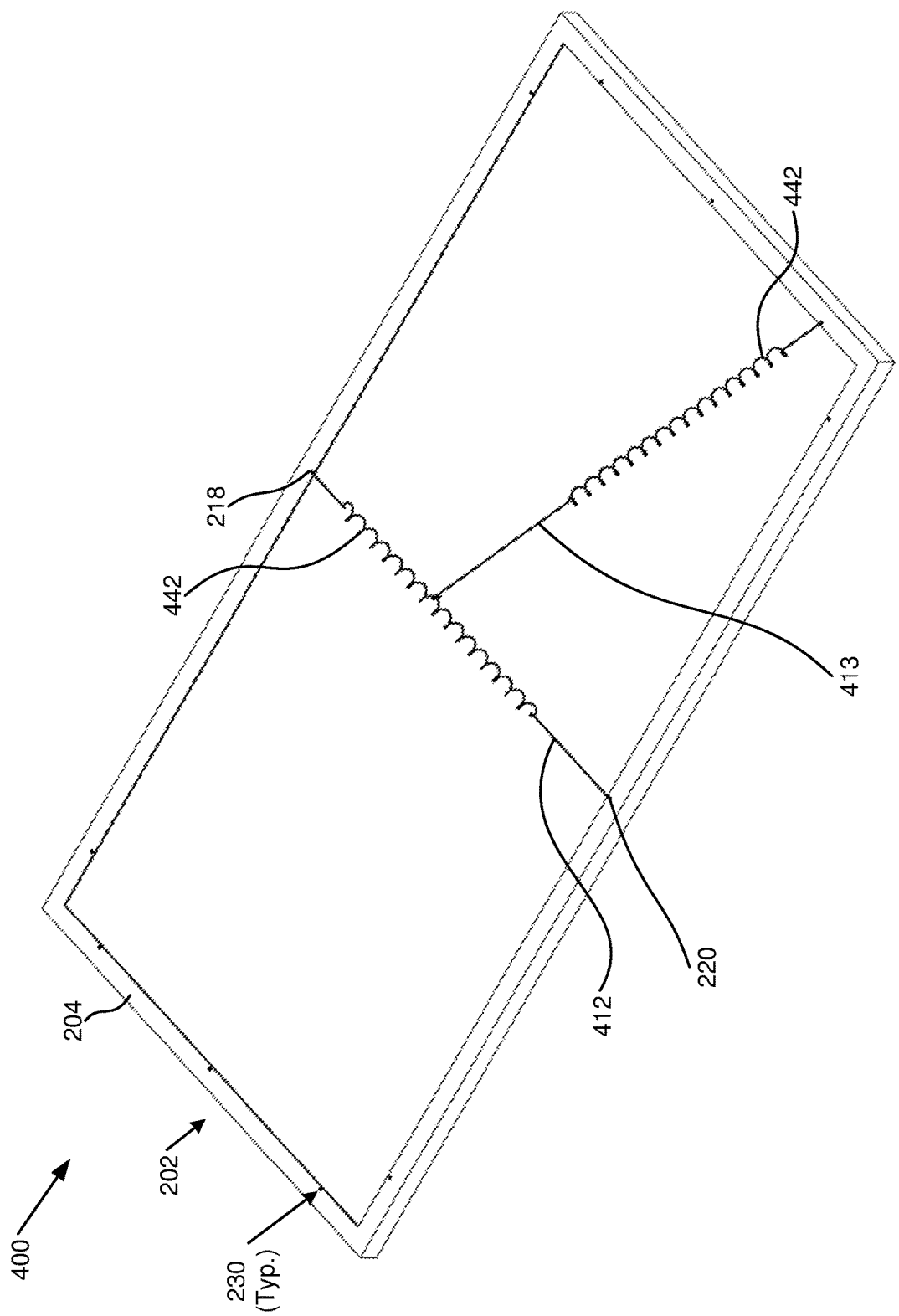
FIG. 4A is a perspective view illustrating a panel with a first spanning member with a spring section connected between openings of a panel frame and a second spanning member with a spring section connected between an opening in the frame and the first spanning member, according to various embodiments.

FIG. 4A is a perspective view 400 illustrating a panel 202 with a first spanning member 412 with a spring section 442 connected between openings 230 of a panel frame 204 and a second spanning member 413 with a spring section 442 connected between an opening 230 in the frame 204 and the first spanning member 412, according to various embodiments. FIG. 4B is a close-up view 401 of a connection between the first spanning member 412 and the second spanning member 413 of FIG. 4A, according to various embodiments. The first and second spanning members 412, 413 each include a tensioner in the form of a spring section 442. The panel 202 of FIGS. 4A and 4B is substantially similar to the panel 202 of FIGS. 2A and 2B.

The panel 202, in the embodiments, depicted in FIGS. 4A and 4B includes a first spanning connection point 218 and a second spanning connection point 220 for the first spanning member 412 in the form of openings 230 in the frame 204. In the embodiments depicted in FIGS. 4A and 4B the first spanning member 412 and the second spanning member 413 are rigid and includes a bent end 432 to connect to the openings 230 and to the first spanning member 312. In other embodiments, the spanning members 412, 413 are flexible and may be connected via a cable stop (e.g., 154), cable clamp, or the like. In some embodiments, the spanning members 412, 413 may include a tensioner different than the spring section 442, such as a tensioner located in a middle section of a spanning member 412, 413.

In some embodiments, instead of tensioner in the form of a spring 442, a section of the spanning member 412 is in the form of a wire weave that provides some flexibility and spring force. The wire weave allows some stretching of the spanning member 412 sufficient to allow an end of the spanning member 412 to stretch enough to fit into a spanning connection point 218, 220 while retaining enough rigidity to hold the spanning member 412 taught to support a wire 110. A section of the spanning member 412 in the form of a spring or a wire weave are two of many possible designs to provide a spanning member 412 with a spring force serving as a tensioner.

Figure 5A:
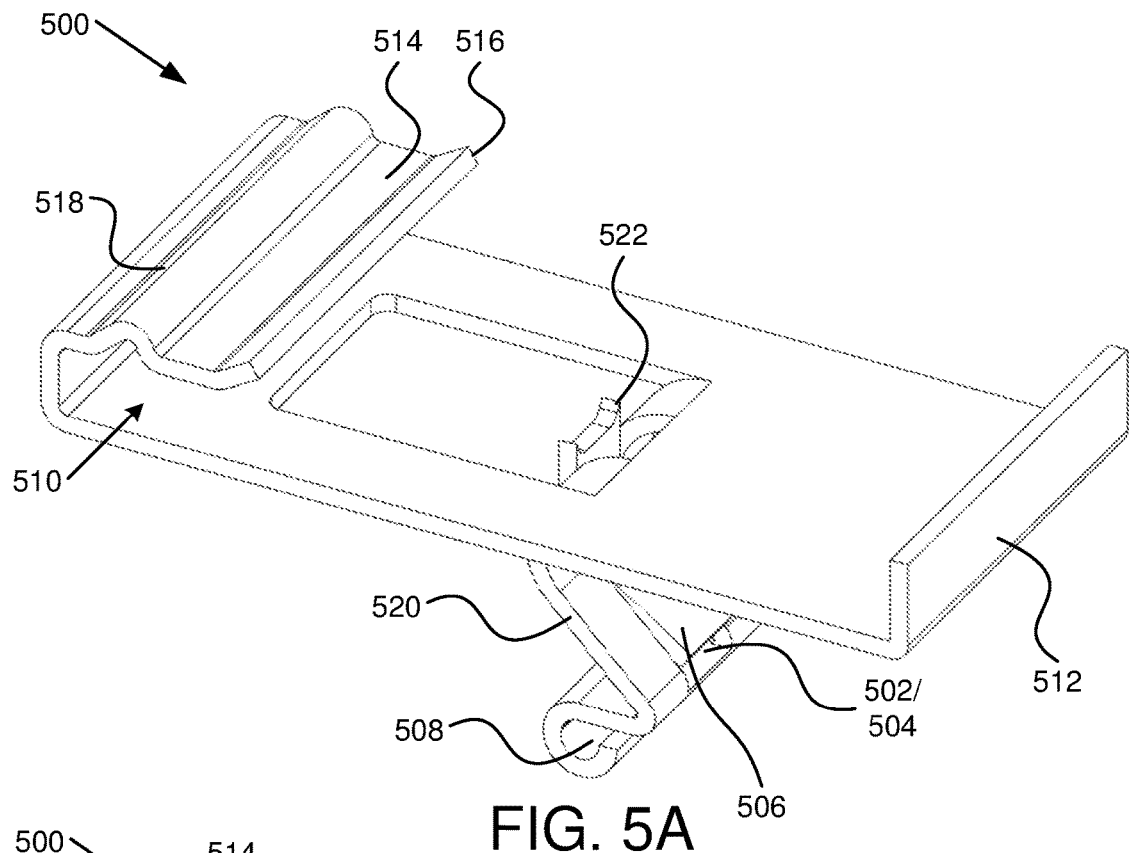
FIG. 5A is a perspective view illustrating a mounting clip with a spanning member connection point and slack management slot, according to various embodiments.
Figure 5B:
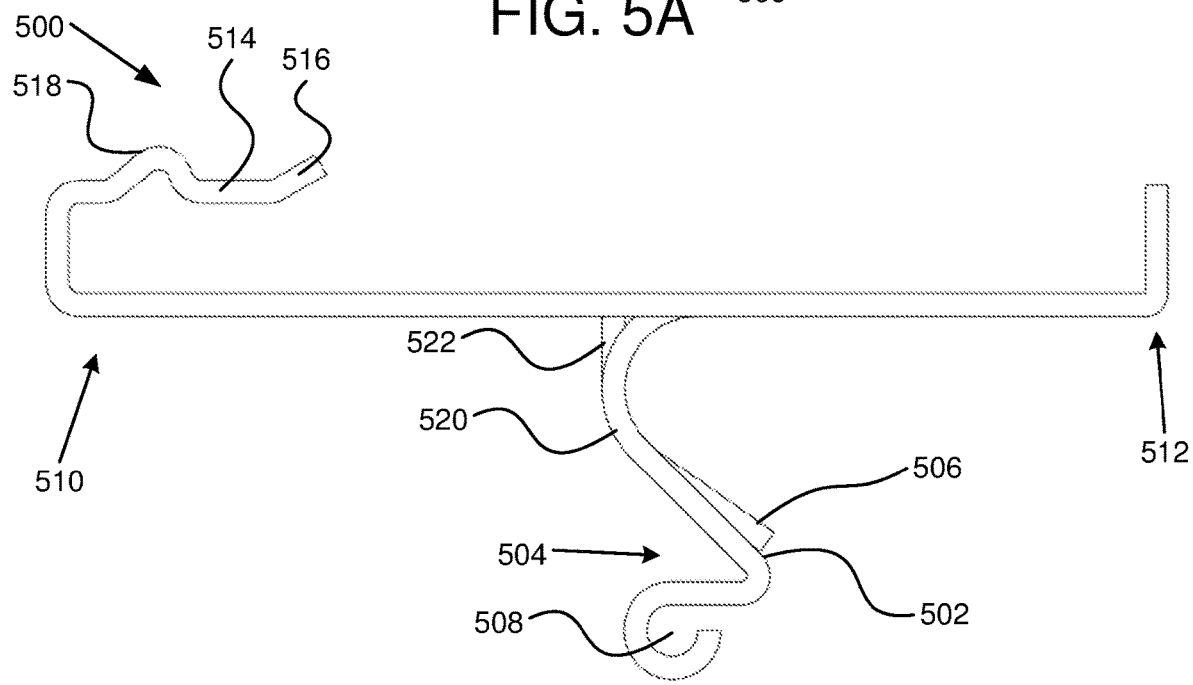
FIG. 5B is a side view of the mounting clip of FIG. 5A.
Figure 5C:
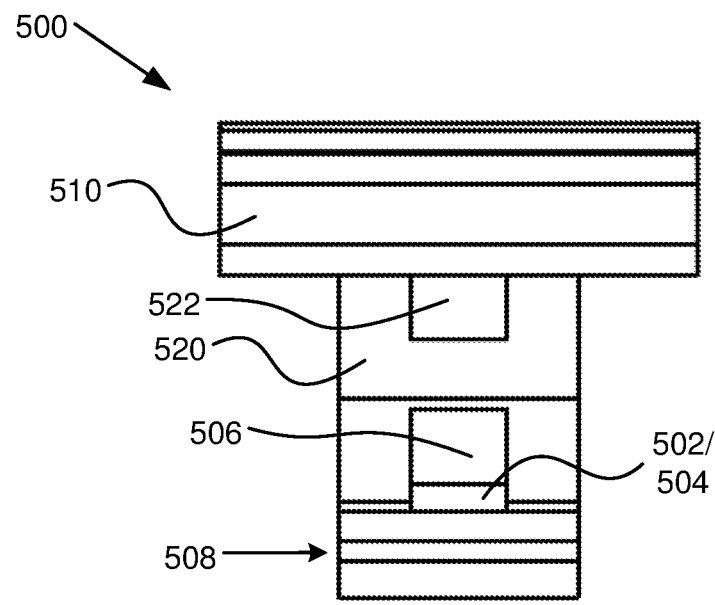
FIG. 5C is a first end view of the mounting clip of FIG. 5A.
Figure 5D:
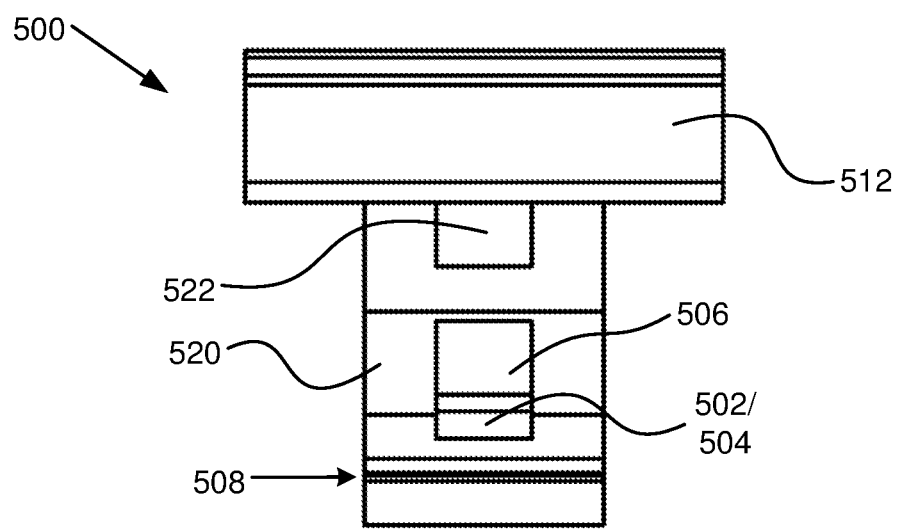
FIG. 5D is a second end view of the mounting clip of FIG. 5A.

FIG. 5A is a perspective view illustrating a mounting clip 500 with a spanning member connection point 502 and slack management slot 508, according to various embodiments. FIG. 5B is a side view of the mounting clip 500 of FIG. 5A, FIG. 5C is a first end view of the mounting clip 500 of FIG. 5A, and FIG. 5D is a second end view of the mounting clip 500 of FIG. 5A. The spanning member connection point 502 includes and opening 504 for a spanning member (e.g., 112, 212, 312, 313, 412, 413). A tab 506 angled toward the opening 504 provides a tensioner to resist movement of the spanning member in a direction toward the tab 506 (right to left in FIG. 5B) and to allow movement in the opposite direction (left to right in FIG. 5B).

The slack management slot 508 is configured so that for a flexible spanning member, an end extending past the tab 506 is able to be wrapped back around and inserted into the slack management slot 508. The slack management slot 508 is sized to accommodate the diameter and/or shape of the spanning member and provides a convenient way to hold an excess length of the spanning member extending past the tab 506 of the tensioner of the mounting clip 500.

The mounting clip 500 is shaped to fit around an edge of a frame of a panel, such as the frame 104 of the panel 102 of FIGS. 1A and 1B or the panels 202 of FIGS. 2A, 2B, 3A, 3B, 4A, 4B. The mounting clip 500 includes a U-shaped section 510 configured to fit around a first edge of the frame and an L-shaped section 512 to fit around a second edge of the frame opposite the first edge, as depicted in FIG. 1A. A side 514 of the U-shaped section 510, in some embodiments, includes a beveled edge 516 shaped to facilitate sliding the U-shaped section 510 around an edge of the frame. A curved section 518 of the side 514 of the U-shaped section 510 may be included to provide a spring force to allow the mounting clip 500 to bend when sliding the L-shaped section 512 around an edge of the frame.

An extension section 520 is configured to place the spanning member connection point 502 a distance away from the frame. The length of the extension section 520 is sized to provide a chosen distance from the spanning member connection point 502 to the frame. In some embodiments, an anchor tab 522 extends from the extension section 520 and is sized to contact the frame to further hold the mounting clip 500 against the frame. In some embodiments, an end of the anchor tab 522 is spiked to dig into the frame. The mounting clip 500 is sized for a particular frame and different sizes may be provided for different frames.

In some embodiments, the extension section 520 is shaped to provide a spring force and act as a tensioner. As a spanning member (e.g., 112, 212, 312, 412, 413) is inserted into the opening, force may be applied to the spanning member 112, 212, 312, 412, 413 and to the extension section 520 so that the extension section 520 flexes, which then provides a spring force on the spanning member 112, 212, 312, 412, 413. Where two mounting clips 500 are used, both provide a spring force through the extension section 520. Each extension section 520, in some embodiments, also includes a tab 506 provides one-way locking of the spanning member 112, 212, 312, 412, 413. In some embodiments, one of the mounting clips 500 does not have a locking tab 506 and the spanning member 112, 212, 312, 412, 413 includes a cable stop 154 and a mounting clip 500 at an opposite end of the spanning member 112, 212, 312, 412, 413 has a locking tab 506.

Figure 6A:
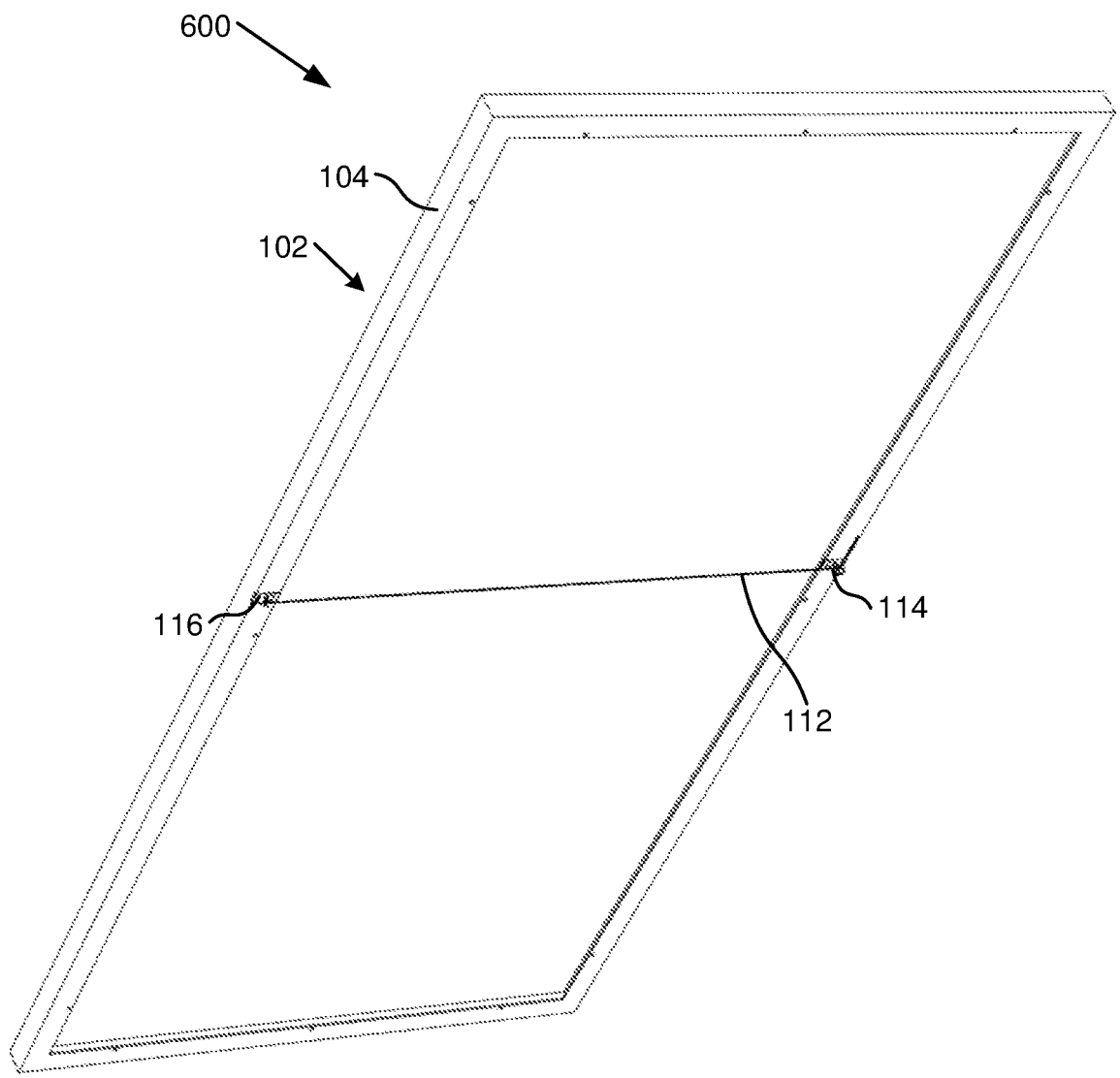
FIG. 6A is a perspective view illustrating a panel with a spanning member connected between a mounting clips similar to the mounting clip of FIGS. 5A-5D that are connected to a panel frame, according to various embodiments.
Figure 6B:
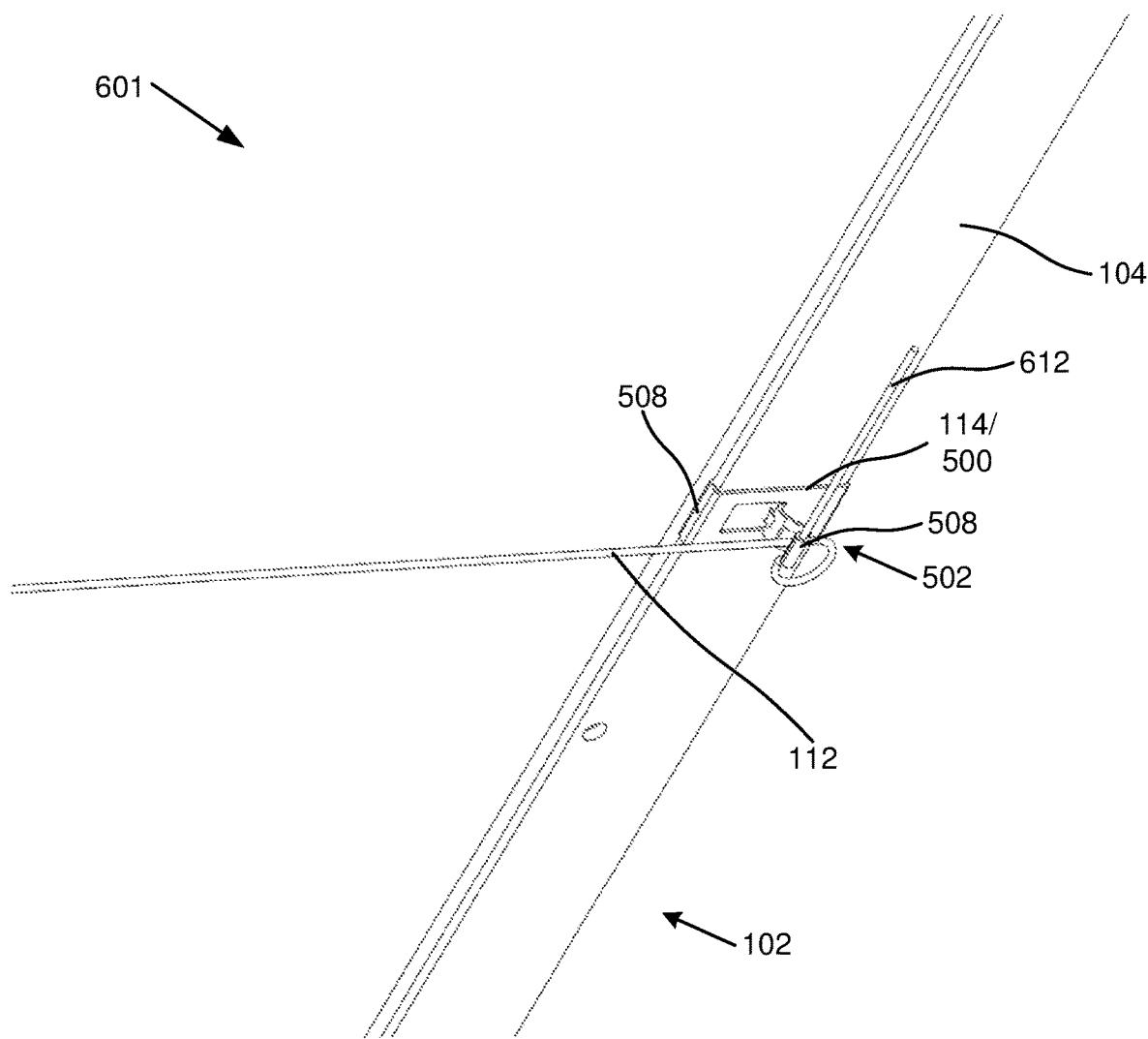
FIG. 6B is a close-up view of a first mounting clip of FIG. 6A connected to the frame, according to various embodiments.
Figure 6C:
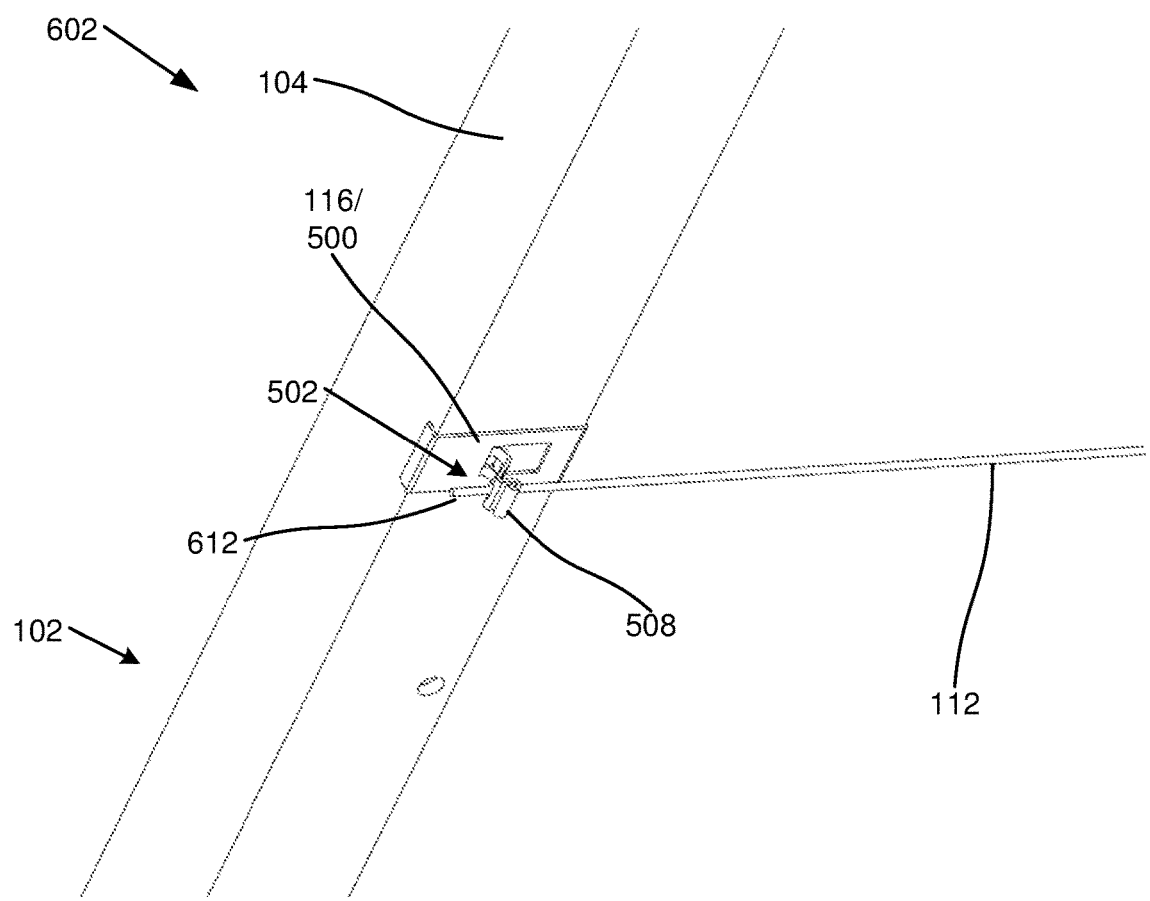
FIG. 6C is a close-up view of a second mounting clip of FIG. 6A connected to the frame, according to various embodiments.
Figure 6D:
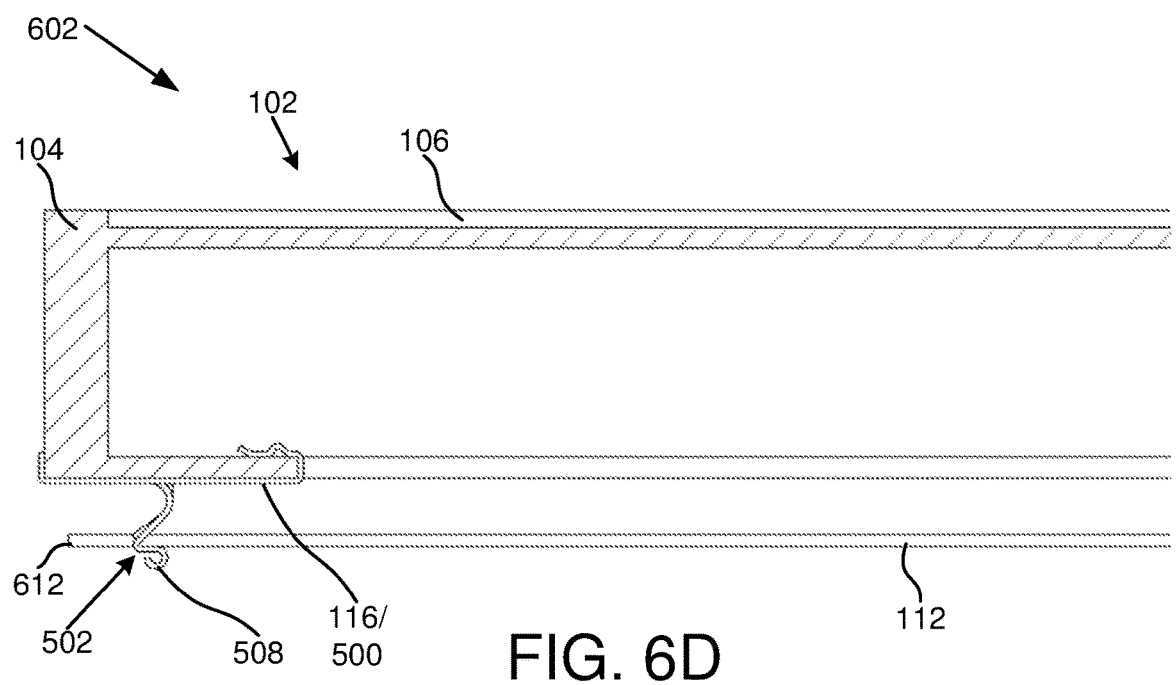
FIG. 6D is a close-up side section view of the second mounting clip of FIG. 6A connected to the frame, according to various embodiments.

FIG. 6A is a perspective view 600 illustrating a panel 102 (or panel 202) with a spanning member 112 connected between a mounting clips 114, 116 similar to the mounting clip of FIGS. 5A-5D that are connected to a panel frame 104, according to various embodiments. FIG. 6B is a close-up view 601 of a first mounting clip 114 of FIG. 6A connected to the frame 104, according to various embodiments. FIG. 6C is a close-up view 602 of a second mounting clip 116 of FIG. 6A connected to the frame 104, according to various embodiments. FIG. 6D is a close-up side section view 603 of the second mounting clip 116 of FIG. 6A connected to the frame 104, according to various embodiments.

The panel 102 is similar to the panels of FIGS. 1A, 1B, 2A, 2B, 3A, 3B, 4A, and 4B. In some embodiments, the panel 102 is a solar panel, as described in FIGS. 1A and 1B. The panel 102 includes a frame 104 with a spanning member 112 connected between a first mounting clip 114 and a second mounting clip 116, which are attached to the frame 104. FIG. 6B depicts the first mounting clip 114, which is substantially similar to the mounting clip 500 of FIGS. 5A-5D. In FIG. 6B, the spanning member 112 is flexible, such as a flexible cable and is routed through the spanning member connection point 502 and an end 612 exiting the spanning member connection point 502 loops back around and is inserted in the slack management slot 508.

FIGS. 6B and 6C depict the second mounting clip 116 attached to the frame 104 where the first mounting clip 114 is also the substantially similar to the mounting clip 500 of FIGS. 5A-5D. In FIG. 6C, an end 612 of the spanning member 112 extends from the first mounting clip 114, but is short and is not long enough to connect to the slack management slot 508. While a flexible spanning member 112 is depicted in FIGS. 6A-6D, in other embodiments a spring 240, 442, as depicted in FIGS. 3B, 4A could be added to either a rigid spanning member or to a flexible spanning member and could be used with the mounting clips 500 of FIGS. 5A-5D, 6A-6D or the mounting clips 900 of FIGS. 9A-9D.

FIG. 7 is a side view of an illustration 700 of a spanning member 112 with a wire 110 wrapped around the spanning member 112, according to various embodiments. Where a wire support 122 is not provided, the wire 110 may be wrapped around a spanning member 112. The wire 110 is depicted with some type of termination 702, which may be plugged into a junction box 108 or other connector.

Figure 8:
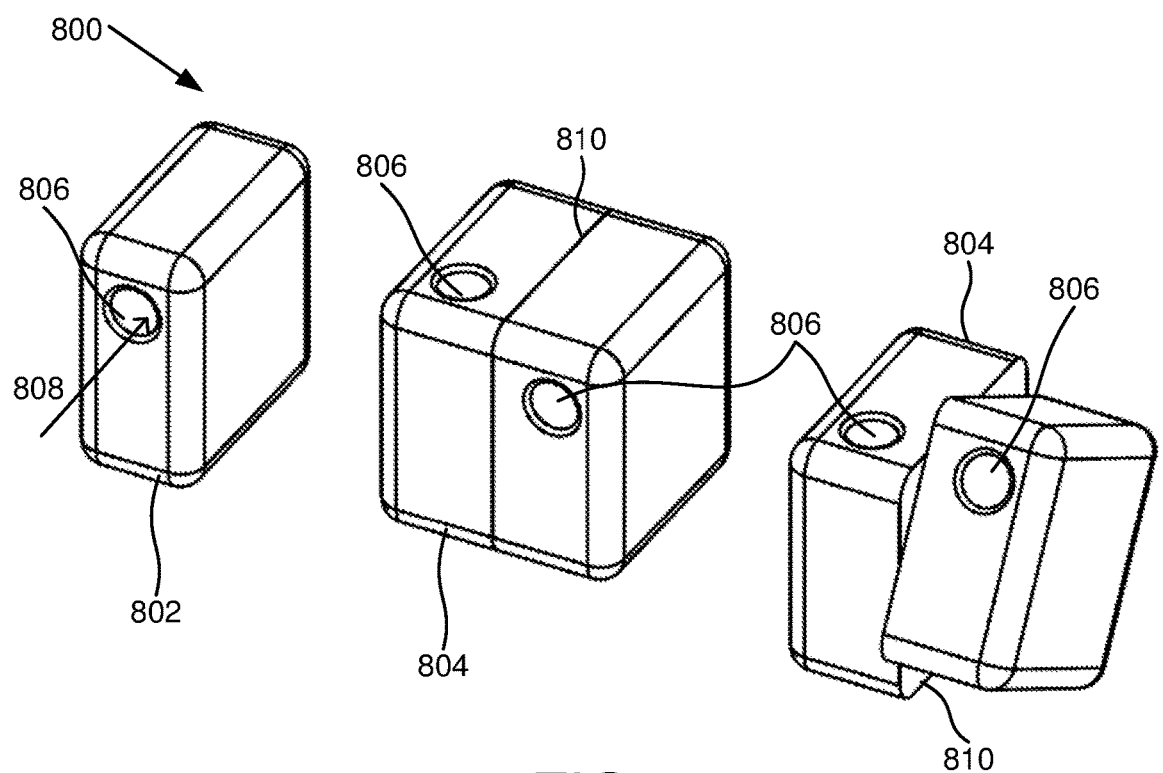
FIG. 8 is a perspective view of a single hole tensioner and two views of a double-hole tensioner, according to various embodiments.

FIG. 8 is a perspective view 800 of a single tensioner 802 and two views of a double-hole tensioner 804, according to various embodiments. The single tensioner 802 is configured for a spanning member 112 to be inserted into an opening 806 and exit another opening (not shown). The single tensioner 802 includes locking mechanism configured to resist movement of the spanning member 112 in a first direction 808 and configured to allow movement of the spanning member 112 in a second direction opposite the first direction. In some embodiments, the opening 806 is a lock path entrance that is part of a lock path extending through the single tensioner 802 to a lock path exit. In some embodiments, the single tensioner 802 includes a slack management opening (not shown) integral to a housing of the single tensioner 802 that is configured to hold a portion of the spanning member 112 extending from the lock path exit. In some embodiments, the single tensioner 802 may be used in an application where the mounting clips 114, 116 are not locking, such as for holes 230 in the panel 202.

In various embodiments, the first tensioner is substantially similar to the locking apparatus described in U.S. Provisional patent application Ser. No. 17/990,683 for Brady Schimpf et al., titled "LOCKING APPARATUS FOR WIRE MANAGEMENT WITH SLACK CABLE MANAGEMENT," filed Nov. 19, 2022 [hereinafter "the '683 Application"] and the locking apparatus described in U.S. Provisional patent application Ser. No. 18/087,634 for Brady Schimpf et al., titled "LOCKING APPARATUS FOR WIRE MANAGEMENT," filed Dec. 22, 2022 [hereinafter "the '634 Application"], which are incorporated herein by reference for all purposes.

The double tensioner 804 is similar to the single tensioner 802 but is joined with a second tensioner connected with a pivot device (not shown) that allows the two tensioners 804 to rotate along a plane 810, as depicted in the double tensioner 804 to the right, which allows two spanning members 112 to be inserted at right angles or in a same direction. For example, the double tensioner 804 may be used in an application where the first and second mounting clips 114, 116 are not locking and spanning members 112 at the mounting clips 114, 116 include cable stops 154 and the double tensioner 804 is located between the mounting clips 114, 116. In some embodiments, the double tensioner 804 has a pivot device but locks into a particular position.

In some embodiments, one or both of the tensioners 802, 804 each include a metal body with a covering. In some embodiments, the metal includes stainless-steel, steel, zinc-coated steel, and/or aluminum. In other embodiments, the covering is plastic, a polymer, rubber, an electrical insulation material, a ultraviolet ("UV") light-resistant material, a weather-resistant material, or the like. In some embodiments, the covering includes an opening exposing a marking on the metal body, such as a model number, a serial number, etc.

In some embodiments, the locking mechanism of the tensioners 802, 804 includes three balls positioned to surround the spanning member 112 extending through the locking mechanism. In other embodiments, the locking member includes a plate where the plate includes a retaining structure for each of three balls shaped to maintain a ball of the three balls in a position against the spanning member 112. In other embodiments, the locking mechanism includes a spring positioned to push on the plate to maintain pressure on the three balls. In some embodiments, one or both of the tensioners 802, 804 include an injection molded body. Details of the locking mechanism, the housing, the body, the slack management opening, etc. are described in more detail in the '683 application and/or the '634 application.

Figure 9A:
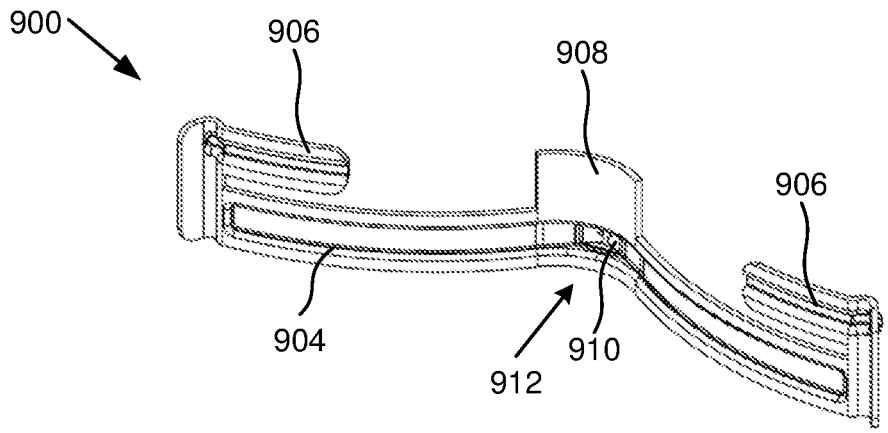
FIG. 9A is a perspective view of another mounting clip configured to mount to a frame of a panel, according to various embodiments.
Figure 9B:
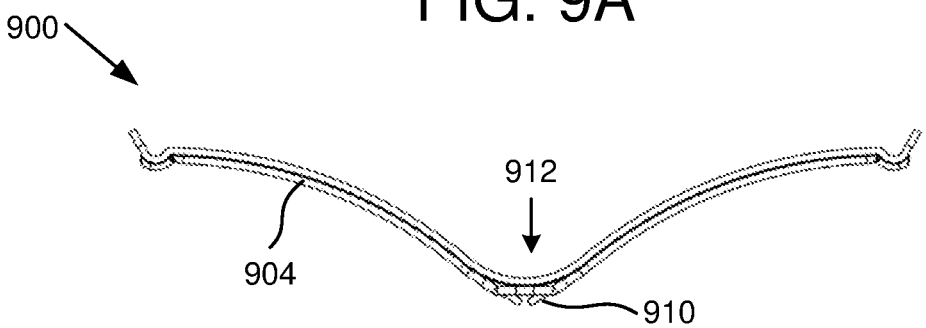
FIG. 9B is a top view of the mounting clip of FIG. 9A, according to various embodiments.
Figure 9C:
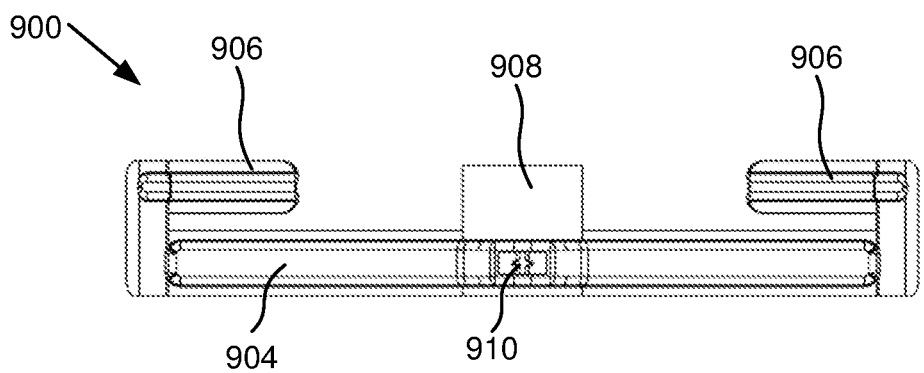
FIG. 9C is a side view of the mounting clip of FIG. 9A, according to various embodiments.
Figure 9D:
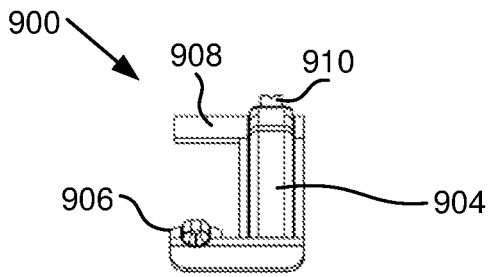
FIG. 9D is an end view of the mounting clip of FIG. 9A, according to various embodiments.

FIG. 9A is a perspective view of another mounting clip 900 configured to mount to a frame 104 of a panel 102, according to various embodiments. FIG. 9B is a top view of the mounting clip 900 of FIG. 9A, according to various embodiments. FIG. 9C is a side view of the mounting clip 900 of FIG. 9A, according to various embodiments. FIG. 9D is an end view of the mounting clip 900 of FIG. 9A, according to various embodiments. The mounting clip 900 is configured to mount to an edge of the frame 104, as depicted in FIG. 1B. In other embodiments, the mounting clip 900 is configured to mount to any flanged structural component. In some examples, the mounting clip 900 is configured to mount to an I-beam, an angle iron, or the like. The mounting clip 900 includes a spring section 904 with front clips 906 and a back clip 908. The mounting clip 900 includes a tensioner 910 which is a spanning member connection point 118, 120.

The tensioner 910 is in the form of a hole with tabs bent in a direction away from the spring section 904. A spanning member 112 inserted in the tensioner 910 from a direction 912 away from a direction of that the tabs are bent so that the spanning member 112 is prevented from moving in an opposite direction. Front clips 906 are configured to wrap around an inside edge of the frame 104, as depicted in FIG. 1B, and a back clip 908 is configured to extend up a front edge of the frame 104.

In some embodiments, the mounting clip 900 is made of a metal or other material configured with a spring force so that when installed on a frame 104, the mounting clip 900 is configured to flex toward the frame 104 when a force on the spanning member 112 is directed toward a center between mounting clips 114, 116 on a panel 102.

In some embodiments, the mounting clips 900 do not include a tensioner 910 but include a hole for the spanning member 112. In the embodiments, a stopping mechanism such as a cable stop 154, button, flared out section, or similar device larger than the opening prevents the spanning member 112 from going past the stopping mechanism. In the embodiments, a separate tensioner, such as the tensioners 802, 804 of FIG. 8 provide tension to the spanning member (s) 112.

Figure 10:
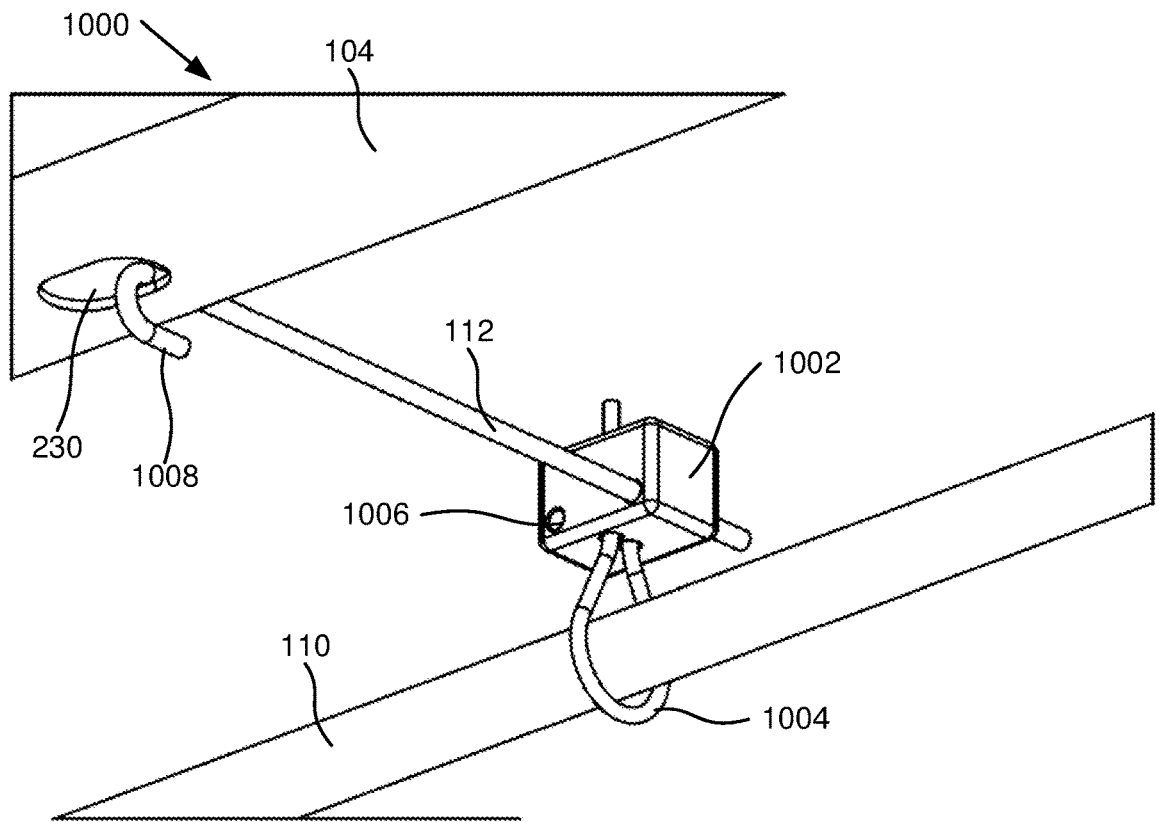
FIG. 10 is a partial bottom perspective view of a panel frame with a spanning member connected to a three-hole tensioner with a wire support loop supporting a wire, according to various embodiments.

FIG. 10 is a partial bottom perspective view 1000 of a panel frame 104 with a spanning member 112 connected to a three-hole tensioner 1002 with a wire support loop 1004 supporting a wire, according to various embodiments. The spanning member 112 in FIG. 10 is rigid and a bent end 1008 of the spanning member 112 extends through a hole 230 in the frame 104. The spanning member 112 extends through the three-hole tensioner 1002 that includes a first hole for the spanning member 112, a second hole 1006 for another spanning member 112, and a third hole for a wire support loop 1004. Each hole extends through the three-hole tensioner 1002 and includes a locking mechanism. The first hole with the spanning member 112 and second hole 1006 have locking mechanisms that are positioned opposite each other so that as the spanning members 112 can be pushed in toward the three-hole tensioner 1002 but oppose movement of the spanning members 112 away from the three-hole tensioner 1002.

The wire support loop 1004, in some embodiments, is connected to the three-hole tensioner 1002 with another end free to loop around the wire 110 and through a third hole of the three-hole tensioner 1002. In some embodiments, a locking mechanism of the third hole allows insertion of the wire support loop 1004 but opposes pulling the wire support loop 1004 in a direction toward the wire 110, which would loosen the wire support loop 1004 from around the wire 110.

Figure 11:
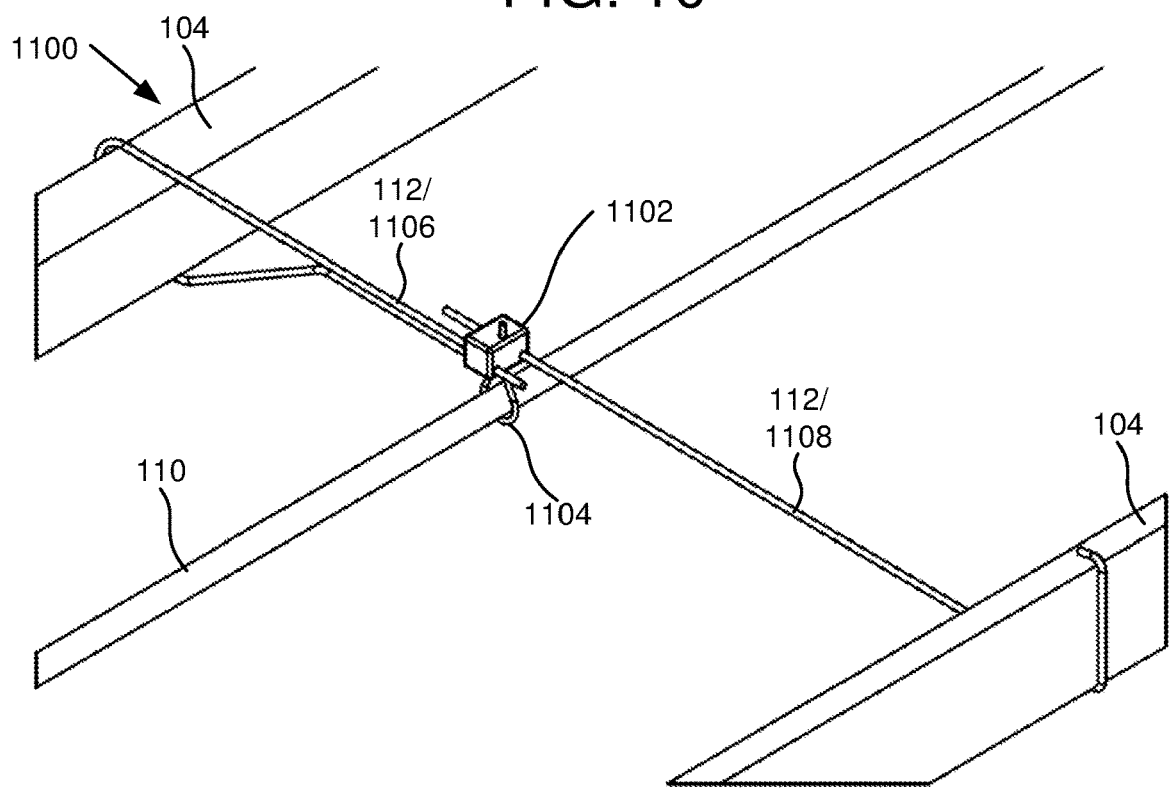
FIG. 11 is a partial perspective top view of a panel frame with two spanning members connected to a three-hole tensioner with a wire support loop supporting a wire, according to various embodiments.

FIG. 11 is a partial perspective top view 1100 of a panel frame with two spanning members 1106, 1108 connected to a three-hole tensioner 1102 with a wire support loop 1104 supporting a wire 110, according to various embodiments. The first and second spanning members 1106, 1108 are substantially similar to the spanning members 112, 212 described above and may be rigid or flexible. In the embodiment, a first spanning member 1106 is flexible and wraps around a frame 104 of a panel 102, which may be a solar panel. In some embodiments, the panel 102 and frame 104 are substantially similar to the panel and frame of FIGS. 1A, 1B, 2A, 2B, 3A, 3B, 4A, 4B, 6A-D, and/or 10.

In some embodiments, the first spanning member 1106 has an end connected to the frame 104 and wraps around the frame 104 and has an end inserted into a first hole of the three-hole tensioner 1102, which includes a locking mechanism. In some embodiments, the three-hole tensioner 1102 of FIG. 11 is similar to the three-hole tensioner 1002 of FIG. 10 but includes a flexible first spanning member 1106 connected to the housing of the three-hole tensioner 1102. The second spanning member 1108 is depicted as rigid and has a portion wrapped around the frame 104. The second spanning member 1108 is inserted into a second hole of the three-hole tensioner 1102, which includes a locking mechanism. In other embodiments, the second spanning member 1108 is also flexible with an end connected to the housing, the same as the first spanning member 1106.

In some embodiments, the three-hole tensioner 1102 includes a wire support loop 1104 with an end connected to the housing of the three-hole tensioner 1102 and wrapped around a wire 110 and then the wire support loop 1104 is inserted into a third hole of the three-hole tensioner 1102, which includes a locking mechanism. In some embodiments, the three-hole tensioner 1102 is connected to the frame 104 using the first and second spanning members 1106, 1108 with an adequate amount of tension put on the spanning members 1106, 1108. The wire support loop 1104 is then used to secure a wire 110. The three-hole tensioners 1002, 1102, in some embodiments, have a housing, a covering, a locking member, etc. as described in the '683 Application and the '634 Application.

Figure 12:
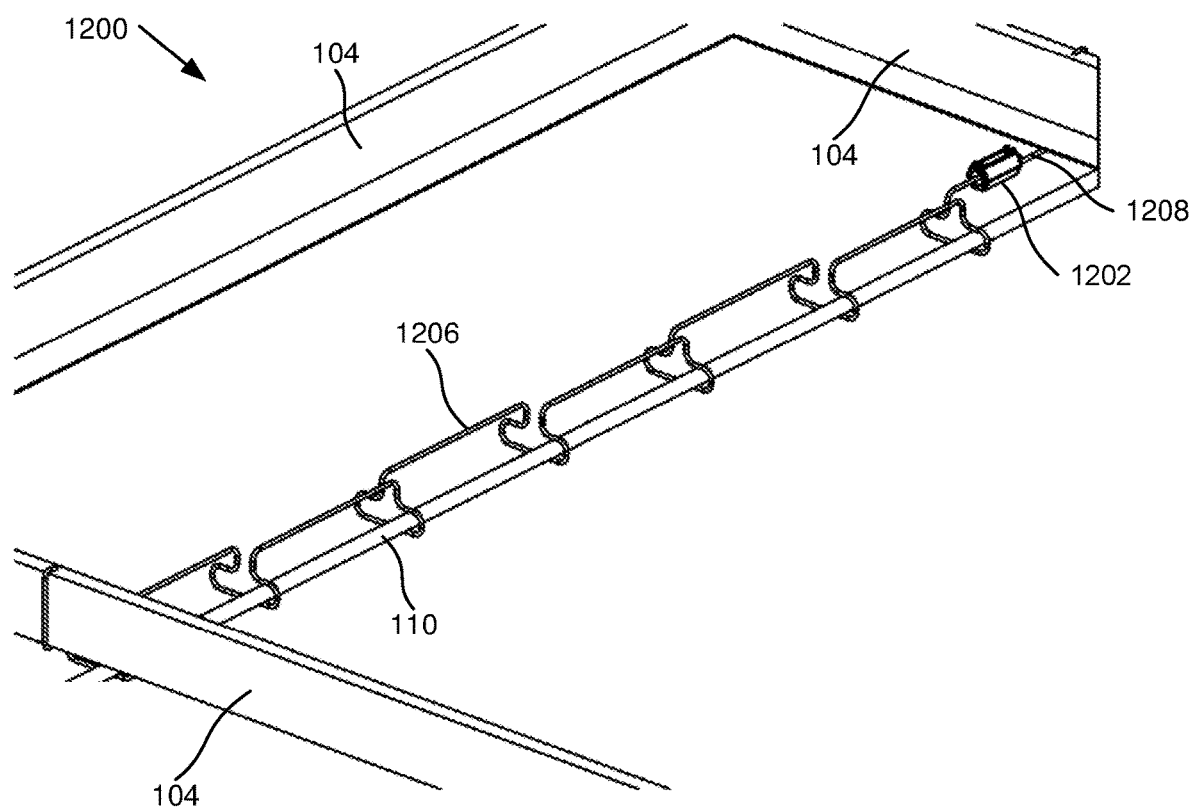
FIG. 12 is a partial perspective top view of a panel frame with a spanning member shaped as a wire hanger supporting a wire, according to various embodiments.

FIG. 12 is a partial perspective top view 1200 of a panel frame 104 with a spanning member 1206 shaped as a wire hanger supporting a wire 110, according to various embodiments. In the embodiments, a first spanning member 1206 is rigid with an end wrapping around a frame 104 of a panel 102, which may be a solar panel. In some embodiments, the panel 102 and frame 104 are substantially similar to the panel and frame of FIGS. 1A, 1B, 2A, 2B, 3A, 3B, 4A, 4B, 6A-D, 10, and/or 11. The first spanning member 1206 is shaped to be a wire hanger so that a wire 110 can be placed in supporting loops of the first spanning member 1206. An end of the first spanning member 1206 is inserted into a two-hole tensioner 1202. A second spanning member 1208 is also rigid with one end wrapped around the frame 104 and another end inserted into a second opening of the two-hole tensioner 1202. Each of the holes in the two-hole tensioner 1202 extend through a housing of the two-hole tensioner 1202 and each hole has a locking mechanism so that pushing the first and second spanning members 1206, 1208 through the two-hole tensioner 1202 adds tension to the first and second spanning members 1206. The two-hole tensioner 1202, in some embodiments, has a housing, a covering, a locking member, etc. as described in the '683 Application and the '634 Application.

While various embodiments described and depicted herein refer to a spanning member 112, 212, 312, 412, 413, 1106, 1108, 1206 connected between a first spanning member connection point 118 and a second spanning member connection point 120 connected to a mounting clip 114, 116 or directly to a frame 102, 202 of a panel 102, 202, the embodiments described herein are not s limited. In other embodiments, a spanning member 112, 212, 312, 412, 413, 1106, 1108, 1206 may connect to first and second spanning member connection points 118, 120, 218, 220 of some type of frame that is not a frame 104, 204 of a panel 102, 202 either directly or on mounting clips 114, 116, 150, 152, 500,

900. In some examples, the frame is a support structure for panels, such as mounting rails or posts holding up solar panels or other electrical panels. In other examples, the frame may be ceiling trusses above ceiling tiles, structural steel beams, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first mounting clip;
   a second mounting clip, wherein the first and second mounting clips are configured to connect to a frame of a panel, the first mounting clip comprising a first spanning member connection point and the second mounting clip comprising a second spanning member connection point;
   a spanning member configured to connect between the first spanning member connection point and the second spanning member connection point; and
   at least one tensioner configured to provide tension to the spanning member while the spanning member is connected between the first mounting clip and the second mounting clip,
   wherein the spanning member is configured to support a wire of the panel.

2. The apparatus of claim 1, wherein one of:
   the spanning member comprises a cable stop at a first end of the spanning member and a tensioner of the at least one tensioner at a second end of the spanning member;
   the spanning member comprises a cable stop at each end of the spanning member and a tensioner of the at least one tensioner between the first and second mounting clips; and
   the at least one tensioner comprises a first tensioner on the spanning member at the first end of the spanning member and a second tensioner on the spanning member at the second end of the spanning member.

3. The apparatus of claim 2, wherein:
   the cable stop positioned on a side of the first mounting clip opposite a center section between the first and second mounting clips is configured to prevent the spanning member from being pulled through the first spanning member connection point resulting from a force applied to the spanning member toward the center section; and
   at least one of the first tensioner and the second tensioner each comprise a locking mechanism positioned on a side of the first or second spanning member connection point opposite the center section and configured to resist movement of the spanning member in a first direction toward the center section and configured to allow movement of the spanning member in a second direction opposite the first direction, wherein applying a force on the spanning member on an end of the spanning member with a tensioner in the second direction provides tension to the spanning member.

4. The apparatus of claim 1, wherein the at least one spanning member tensioner comprises a spring force provided by at least one of the first mounting clip and the second mounting clip resulting from a force applied to the spanning member in a direction opposite a center section between the first and second mounting clips and securing the spanning member at the first and second spanning member connection points after the force is applied to the spanning member.

5. The apparatus of claim 1, wherein one or both of the first mounting clip and the second mounting clip comprise a locking mechanism configured to resist movement of the spanning member in a first direction toward a center section between the first and second mounting clips and configured to allow movement of the spanning member in a second direction opposite the first direction, wherein applying a force on the spanning member on an end of the spanning member in the second direction provides tension to the spanning member.

6. The apparatus of claim 1, wherein at least one of the first spanning member connection point and the second spanning member connection point comprise one or more openings sized to accommodate the spanning member.

7. The apparatus of claim 1, further comprising one or more wire supports connected to the spanning member, each wire support configured to support the wire of the panel.

8. The apparatus of claim 1, wherein the spanning member comprises a cable and wherein at least one of the first mounting clip and the second mounting clip each comprise a slack management opening configured to hold a portion of the spanning member extending from the first or second mounting clip.

9. The apparatus of claim 1, wherein the spanning member comprises at least a portion that is rigid.

10. An apparatus comprising:
    a first mounting clip configured to attached to a frame of a panel;
    a first spanning member connection point on the first mounting clip;
    a second spanning member connection point, wherein the first and second spanning member connection points are each configured to be positioned on the frame of the panel;
    a spanning member configured to connect between the first spanning member connection point and the second spanning member connection point; and
    at least one tensioner configured to provide tension to the spanning member while the spanning member is connected between the first spanning member connection point and the second spanning member connection point,
    wherein the spanning member is configured to support a wire of the panel.

11. The apparatus of claim 10, wherein the second spanning member connection point is on a second mounting clip, wherein the second mounting clip are configured to attach to the frame of the panel.

12. The apparatus of claim 11, wherein one of:
    the spanning member comprises a cable stop at a first end of the spanning member and a tensioner of the at least one tensioner at a second end of the spanning member; and
    the at least one tensioner comprises a first tensioner on the spanning member at the first end of the spanning member and a second tensioner on the spanning member at the second end of the spanning member.

13. The apparatus of claim 12, wherein:
    the cable stop positioned on a side of the first mounting clip opposite a center section between the first and second mounting clips is configured to prevent the spanning member from being pulled through the first spanning member connection point resulting from a force applied to the spanning member toward the center section; and at least one of the first tensioner and the second tensioner each comprise a locking mechanism positioned on a side of the first or second spanning member connection point opposite the center section and configured to resist movement of the spanning member in a first direction toward the center section and configured to allow movement of the spanning member in a second direction opposite the first direction, wherein applying a force on the spanning member on an end of the spanning member with a tensioner in the second direction provides tension to the spanning member.

14. The apparatus of claim 11, wherein the at least one spanning member tensioner comprises a spring force provided by at least one of the first mounting clip and the second mounting clip resulting from a force applied to the spanning member in a direction opposite a center section between the first and second mounting clips and securing the spanning member at the first and second spanning member connection points after the force is applied to the spanning member.

15. The apparatus of claim 11, wherein one or both of the first mounting clip and the second mounting clip comprise a locking mechanism configured to resist movement of the spanning member in a first direction toward a center section between the first and second mounting clips and configured to allow movement of the spanning member in a second direction opposite the first direction, wherein applying a force on the spanning member on an end of the spanning member in the second direction provides tension to the spanning member.

16. The apparatus of claim 10, wherein the spanning member comprises a first spanning member and the tensioner comprises a first tensioner and further comprising a second spanning member with a second tensioner and a third spanning member connection point positioned on the frame, wherein the second spanning member is configured to connect between the third spanning member connection point and the first spanning member.

17. The apparatus of claim 10, wherein the first spanning member connection point and the second spanning member connection point each comprise an opening in the frame of the panel.

18. An apparatus comprising:
a first mounting clip;
a second mounting clip, wherein the first and second mounting clips are configured to connect to a frame of a panel, the first mounting clip comprising a first spanning member connection point and the second mounting clips comprising a second spanning member connection point;
a spanning member configured to connect between the first spanning member connection point and the second spanning member connection point; and
at least one tensioner configured to provide tension to the spanning member while the spanning member is connected between the first mounting clip and the second mounting clip, wherein the spanning member is configured to support a wire of the panel, wherein one of:
the spanning member comprises a cable stop at a first end of the spanning member and a tensioner of the at least one tensioner at a second end of the spanning member; and
the at least one tensioner comprises a first tensioner on the spanning member at the first end of the spanning member and a second tensioner on the spanning member at the second end of the spanning member, wherein:
the cable stop positioned on a side of the first mounting clip opposite a center section between the first and second mounting clips is configured to prevent the spanning member from being pulled through the first spanning member connection point resulting from a force applied to the spanning member toward the center section; and
at least one of the first tensioner and the second tensioner each comprise a locking mechanism positioned on a side of the first or second spanning member connection point opposite the center section and configured to resist movement of the spanning member in a first direction toward the center section and configured to allow movement of the spanning member in a second direction opposite the first direction, wherein applying a force on the spanning member on an end of the spanning member with a tensioner in the second direction provides tension to the spanning member.

* * * * *